United States Patent
Yamagishi

(10) Patent No.: US 10,085,123 B2
(45) Date of Patent: Sep. 25, 2018

(54) INFORMATION PROCESSING APPARATUS AND METHOD, PROGRAM, AND CONTENT SUPPLY SYSTEM

(71) Applicant: SATURN LICENSING LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 196 days.

(21) Appl. No.: 14/654,739

(22) PCT Filed: Feb. 17, 2014

(86) PCT No.: PCT/JP2014/053596
§ 371 (c)(1),
(2) Date: Jun. 22, 2015

(87) PCT Pub. No.: WO2014/132821
PCT Pub. Date: Sep. 4, 2014

(65) Prior Publication Data
US 2015/0327025 A1     Nov. 12, 2015

(30) Foreign Application Priority Data

Feb. 27, 2013 (JP) ................................. 2013-036902

(51) Int. Cl.
*H04N 21/6405* (2011.01)
*H04W 4/06* (2009.01)
(Continued)

(52) U.S. Cl.
CPC .............. *H04W 4/06* (2013.01); *H04H 20/24* (2013.01); *H04H 20/42* (2013.01);
(Continued)

(58) Field of Classification Search
CPC .......... H04N 21/6332; H04N 21/6405; H04N 21/6408; H04N 21/64738
See application file for complete search history.

(56) References Cited

U.S. PATENT DOCUMENTS 8,310,957 B1    11/2012   Rekhter
2005/0259584 A1*  11/2005  Chen ...................... H04L 12/18
370/238
(Continued)

FOREIGN PATENT DOCUMENTS

EP    2 341 709 A1    7/2011
WO    WO 2005/032026 A2    4/2005
(Continued)

OTHER PUBLICATIONS

International Search Report dated Apr. 22, 2014 in PCT/JP2014/053596.
(Continued)

*Primary Examiner* — Nicholas T Corbo
(74) *Attorney, Agent, or Firm* — Oblon, McClelland, Maier & Neustadt, L.L.P.

(57) ABSTRACT

An information processing apparatus including: a determination unit which determines whether or not to use multicast distribution or broadcast distribution for a supply of a content; and an updating unit which, in the case where it is determined to use the multicast distribution or the broadcast distribution by the determination unit, updates control information related to unicast distribution of the content so as to use the multicast distribution or the broadcast distribution for a supply of the content.

24 Claims, 40 Drawing Sheets

(51) Int. Cl.
*H04L 29/06* (2006.01)
*H04L 29/08* (2006.01)
*H04H 20/42* (2008.01)
*H04N 21/6332* (2011.01)
*H04N 21/6408* (2011.01)
*H04N 21/647* (2011.01)
*H04H 20/24* (2008.01)

(52) U.S. Cl.
CPC ............ *H04L 65/608* (2013.01); *H04L 67/02* (2013.01); *H04L 67/2823* (2013.01); *H04L 67/42* (2013.01); *H04N 21/6332* (2013.01); *H04N 21/6405* (2013.01); *H04N 21/6408* (2013.01); *H04N 21/64738* (2013.01)

(56) References Cited

U.S. PATENT DOCUMENTS

| | | |
|---|---|---|
| 2006/0007930 A1 | 1/2006 | Dorenbosch |
| 2006/0050718 A1 | 3/2006 | Corson et al. |
| 2006/0085553 A1* | 4/2006 | Rachwalski ...... G06F 17/30017 709/233 |
| 2007/0002859 A1 | 1/2007 | Corson et al. |
| 2007/0211720 A1 | 9/2007 | Fuchs et al. |
| 2010/0177642 A1 | 7/2010 | Sebastian et al. |
| 2010/0179984 A1 | 7/2010 | Sebastian et al. |
| 2010/0179986 A1 | 7/2010 | Sebastian et al. |
| 2010/0179987 A1 | 7/2010 | Sebastian et al. |
| 2010/0180046 A1 | 7/2010 | Sebastian et al. |
| 2010/0185730 A1 | 7/2010 | Sebastian et al. |
| 2010/0281105 A1 | 11/2010 | Sebastian |
| 2011/0072075 A1* | 3/2011 | Gautier ............... H04L 12/1881 709/203 |
| 2011/0237180 A1 | 9/2011 | Ueno et al. |
| 2012/0254918 A1 | 10/2012 | Takahashi |
| 2012/0320916 A1* | 12/2012 | Sebastian ........... H04N 21/2402 370/390 |
| 2013/0055301 A1* | 2/2013 | Hao ..................... H04H 20/423 725/14 |
| 2013/0111057 A1* | 5/2013 | Yoon .................. H04N 21/2225 709/231 |
| 2013/0282796 A1 | 10/2013 | Sebastian et al. |
| 2013/0282863 A1 | 10/2013 | Sebastian et al. |
| 2014/0029612 A1 | 1/2014 | Sebastian et al. |
| 2015/0026241 A1 | 1/2015 | Sebastian |
| 2015/0032848 A1 | 1/2015 | Sebastian et al. |
| 2015/0207838 A1* | 7/2015 | Gabin ................. H04L 65/4084 709/219 |

FOREIGN PATENT DOCUMENTS

| | | |
|---|---|---|
| WO | WO 2005/117345 A1 | 12/2005 |
| WO | WO 2006/023484 A1 | 3/2006 |
| WO | WO-2006023484 A1 * | 3/2006 ......... H04L 12/1836 |

OTHER PUBLICATIONS

Thomas Stockhammer, et al., "Dash In Mobile Networks and Services" Proceedings of the 2012 IEEE Visual Communications and Image Processing (VCIP), Nov. 2012, 9 Pages.
International Search Report dated Apr. 22, 2014 in PCT/JP2014/053596 (with English translation of category of cited documents).
Extended European Search Report dated Sep. 5, 2016 in European Patent Application No. 14756827.3.

* cited by examiner

FIG. 8

```
<MPD ......>
<Period ......>
<AdaptationSet>
<Representation ......>
......
<BaseURL>http://example.com/counter-10mn_avc_dash.mp4</BaseURL>
<SegmentList ......>
......
<SegmentURL mediaRange="795-83596"/>
<SegmentURL mediaRange="83597-166046"/>
<SegmentURL mediaRange="166047-248857"/>
<SegmentURL mediaRange="248858-331477"/>
......
</MPD>
```

```
GET /counter-10mn_avc_dash.mp4 HTTP/1.1
Host: example.com
Range:bytes=795-83596
```

FIG. 9A

```
GET /counter-10mn_avc_dash.mp4 HTTP/1.1
Host: example.com
Range:bytes=83597-166046
```

```
<MPD .....>
<Period .....>
<AdaptationSet>
<Representation .....>
<BaseURL serviceLocationAttributeUrl=" http://example.com/serviceLocationAttributes">..... </BaseURL>
.........
</MPD>
```

FIG. 11

```
<xs:schema xmlns:xs="http://www.w3.org/2001/XMLSchema"
elementFormDefault="qualified" attributeFormDefault="unqualified">
<xs:element name="ServiceLocation" type="ServiceLocationType"/>
<xs:complexType name="ServiceLocationType">
 <xs:sequence>
  <xs:element name="IPMulticastAddress" type="xs:anyURI" maxOccurs="unbounded"/>
  <xs:element name="DeliverySystem" type="DeliverySystemAttributesType" minOccurs="0" maxOccurs="unbounded"/>
 </xs:sequence>
</xs:complexType>
<xs:complexType name="DeliverySystemAttributesType">
 <xs:sequence>
  <xs:element name="DeliverySystemIdentifier" type="xs:string" maxOccurs="unbounded"/>
  <xs:element name="DeliverySystemDescriptor" type="xs:string" maxOccurs="unbounded"/>
 </xs:sequence>
</xs:complexType>
</xs:schema>
```

FIG. 13

```
<bundleDescription
xmlns="urn:3GPP:metadata:2005:MBMS:userServiceDescription"
xmlns:xsi="http://www.w3.org/2001/XMLSchema-instance"
xmlns:r8="urn:3GPP:metadata:2008:MBMS:userServiceDescription">
<userServiceDescription serviceId="urn:123">
  <deliveryMethod sessionDescriptionURI="http://www.example.com/a.sdp"/>
  <r8:Registration>
    <r8:registrationURL>http://www.example.com/register.php</r8:registrationURL>
  </r8:Registration>
</userServiceDescription>
</bundleDescription>
```

FIG. 16

```
<FDT-Instance ....>
  <File Content-Location="http://example.com/counter-10mn_avc_dash.mp4" TOI="1" range="bytes=795-83596"/>
  <File Content-Location="http://example.com/counter-10mn_avc_dash.mp4" TOI="2" range="bytes=83597-166046"/>
  ......
</FDT-Instance>
```

FIG. 21
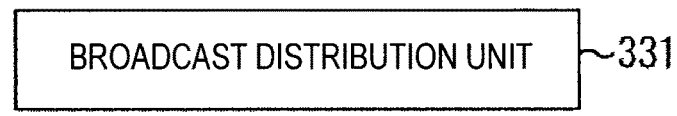
132
FIG. 22
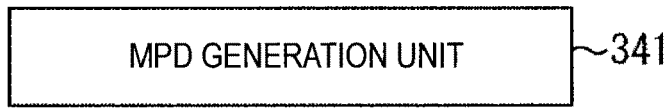
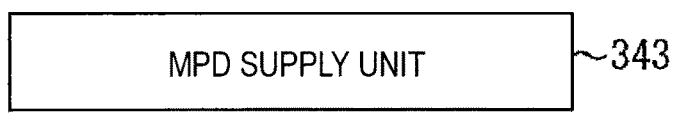
123

INFORMATION PROCESSING APPARATUS AND METHOD, PROGRAM, AND CONTENT SUPPLY SYSTEM

TECHNICAL FIELD

The present disclosure relates to an information processing apparatus and method, a program, and a content supply system, and specifically relates to an information processing apparatus and method, a program, and a content supply system which can more efficiently perform distribution of a content.

BACKGROUND ART

In recent years, the mainstream of streaming services on the internet has become Over The Top Video (OTT-V). The widespread start as this core technology is Dynamic Adaptive Streaming over HTTP (DASH) (for example, refer to Non-Patent Literature 1).

Since DASH is implemented by point-to-point HyperText Transfer Protocol (HTTP) streaming, in the case where applied to the streaming of a content (a program) with the possibility of being viewed by a large number of clients at the same time, such as a sports relay, it may often be necessary for support of a Contents Delivery Network (CDN), for example, such as Akamai (registered trademark).

However, since a CDN is generally not able to obtain scalability of an extent which is comparable to existing broadcast distribution, from cost restrictions, a method can be considered which reduces the load of a network resource by jointly using a multicast or broadcast bearer.

CITATION LIST

Non-Patent Literature

Non-Patent Literature 1: "Implementation of uninterrupted video distribution by an existing Web server", Mitsuhiro Hirabayashi, NIKKEI ELECTRONICS 2012.3.19

SUMMARY OF INVENTION

Technical Problem

However, by only applying this method, it will not usually be limited to having a sufficient cost advantage obtained, in accordance with the capacity or the like of a jointly used multicast/broadcast network resource.

The present disclosure is performed by considering such a situation, and can more efficiently perform distribution of a content.

Solution to Problem

An aspect of the present technology is an information processing apparatus including: a determination unit which determines whether or not to use multicast distribution or broadcast distribution for a supply of a content; and an updating unit which, in the case where it is determined to use the multicast distribution or the broadcast distribution by the determination unit, updates control information related to unicast distribution of the content so as to use the multicast distribution or the broadcast distribution for a supply of the content.

The determination unit may evaluate a cost of the case where multicast distribution or broadcast distribution is to be used for a supply of the content, and determines whether or not to use multicast distribution or broadcast distribution for a supply of the content in accordance with this evaluation result.

A reception unit which receives the control information may be further included, the determination unit may evaluate a cost of the case where multicast distribution or broadcast distribution is to be used for a supply of the content in accordance with the control information received by the reception unit, and determines whether or not to use multicast distribution or broadcast distribution for a supply of the content in accordance with this evaluation result, and in the case where it is determined to use the multicast distribution or the broadcast distribution by the determination unit, the updating unit may update the control information received by the reception unit so as to use the multicast distribution or the broadcast distribution for a supply of the content.

The determination unit may evaluate the cost in accordance with an amount of the control information received by the reception unit.

The reception unit may receive the control information supplied from a client connected to a prescribed network.

The reception unit may receive the control information, supplied from a proxy server of a server supplying the content, which has been collected from a client by the proxy server.

A confirmation unit which confirms a use condition of a resource of multicast distribution or broadcast distribution may be further included, and the determination unit may evaluate the cost for the case where the usable resource confirmed by the confirmation unit is to be used.

A securing unit which, in the case where it is determined to use the multicast distribution or the broadcast distribution by the determination unit, secures a resource of multicast distribution or broadcast distribution for supplying the content may be further included, and the updating unit may update the control information so as to use the resource secured by the securing unit for a supply of the content.

The content may be a stream of a Dynamic Adaptive Streaming over HTTP (DASH) format, and the control information may be a Media Presentation Description (MPD).

The updating unit may store an identifier which identifies multicast distribution or broadcast distribution to be used for a supply of the content in a DeliverySystemIdentifier of a Service Location file designated by a serviceLocationAttribute URL attribute arranged in a BaseURL of the MPD.

The updating unit may store a parameter for acquiring stream data in a system corresponding to an identifier stored in the DeliverySystemIdentifier in a DeliverySystemDescriptor of a Service Location file designated by a serviceLocationAttribute URL attribute arranged in a BaseURL of the MPD.

A unicast distribution unit which unicast distributes a stream for a unicast of the content may be further included.

A conversion unit which converts the stream for a unicast of the content into a stream for multicast distribution or broadcast distribution; and a BC/MC distribution unit which multicast distributes or broadcast distributes the stream generated by the conversion unit may be further included.

The stream for a unicast may be a stream of a Dynamic Adaptive Streaming over HTTP (DASH) format, and the stream for multicast distribution or broadcast distribution generated by the conversion unit may be a file of a File Delivery over Unidirectional Transport (FLUTE) protocol.

The conversion unit may introduce a range attribute as an attribute of a File element in a File Delivery Table (FDT)-Instance of the file of a FLUTE protocol.

A supply unit which supplies the control information updated by the updating unit may be further included.

A supply control unit which acquires the content instead of a client, and supplies the acquired content to the client by unicast distribution, or supplies the acquired content to the client by using a resource of multicast distribution or broadcast distribution, in accordance with the control information supplied by the supply unit may be further included.

An aspect of the present technology is an information processing method including: determining whether or not to use multicast distribution or broadcast distribution for a supply of a content; and updating, in the case where it is determined to use the multicast distribution or the broadcast distribution, control information related to unicast distribution of the content so as to use the multicast distribution or the broadcast distribution for a supply of the content.

An aspect of the present technology is a program for causing a computer to function as: a determination unit which determines whether or not to use multicast distribution or broadcast distribution for a supply of a content; and an updating unit, in the case where it is determined to use the multicast distribution or the broadcast distribution by the determination unit, which updates control information related to unicast distribution of the content so as to use the multicast distribution or the broadcast distribution for a supply of the content.

An aspect of the present technology is a content supply system which supplies a content from a server to a client, including: determining whether or not to use multicast distribution or broadcast distribution for a supply of the content in accordance with an acquisition demand amount of the content from the client; and updating, in the case where it is determined to use the multicast distribution or the broadcast distribution, control information related to unicast distribution of the content so as to use the multicast distribution or the broadcast distribution for a supply of the content from the server to the client.

In the present disclosure, it is determined whether or not to use multicast distribution or broadcast distribution for a supply of a content, and in the case where it is determined to use the multicast distribution or the broadcast distribution, control information related to unicast distribution of the content is updated so as to use the multicast distribution or the broadcast distribution for a supply of the content.

Advantageous Effects of Invention

According to an embodiment of the present disclosure, information related to distribution of a content can be processed. In particular, distribution of a content can be more efficiently performed.

BRIEF DESCRIPTION OF DRAWINGS

FIG. 8 is a figure which shows an XML description example of an MPD.

FIGS. 9A, 9B are figures which describe an example of a segment acquisition demand.

FIG. 10 is a figure which shows an XML description example of an extended MPD.

FIG. 11 is a figure which shows an example of an XML Schema of a ServiceLocation element designated by a serviceLocationAttributeUrl attribute.

FIG. 13 is a figure which shows an example of a User Service Description structure.

FIG. 16 is a figure which shows a data structure of an extended FDT.

FIG. 21 is a function block diagram which shows an example of the functions of a broadcast distribution server.

FIG. 22 is a function block diagram which shows an example of the functions of a DASH-MPD server.

DESCRIPTION OF EMBODIMENTS

Hereinafter, the modes for executing the present disclosure (hereinafter called the embodiments) will be described. Note that, the description will be given in the following order.

0. Outline
1. First embodiment (Content distribution system)
2. Second embodiment (Content distribution system)
3. Third embodiment (Transmission of an MPD and stream)

0. Outline

<Content Distribution System>

In recent years, the mainstream of streaming services on the Internet has become Over The Top Video (OTT-V). The widespread start as this core technology is Dynamic Adaptive Streaming over HTTP (DASH).

Since DASH is implemented by point-to-point HyperText Transfer Protocol (HTTP) streaming, in the case where applied to the streaming of a content (a program) with the possibility of being viewed by a large number of clients at the same time, such as a sports relay, it may often be necessary for support of a Contents Delivery Network (CDN), for example, such as Akamai (registered trademark).

Figure 1:
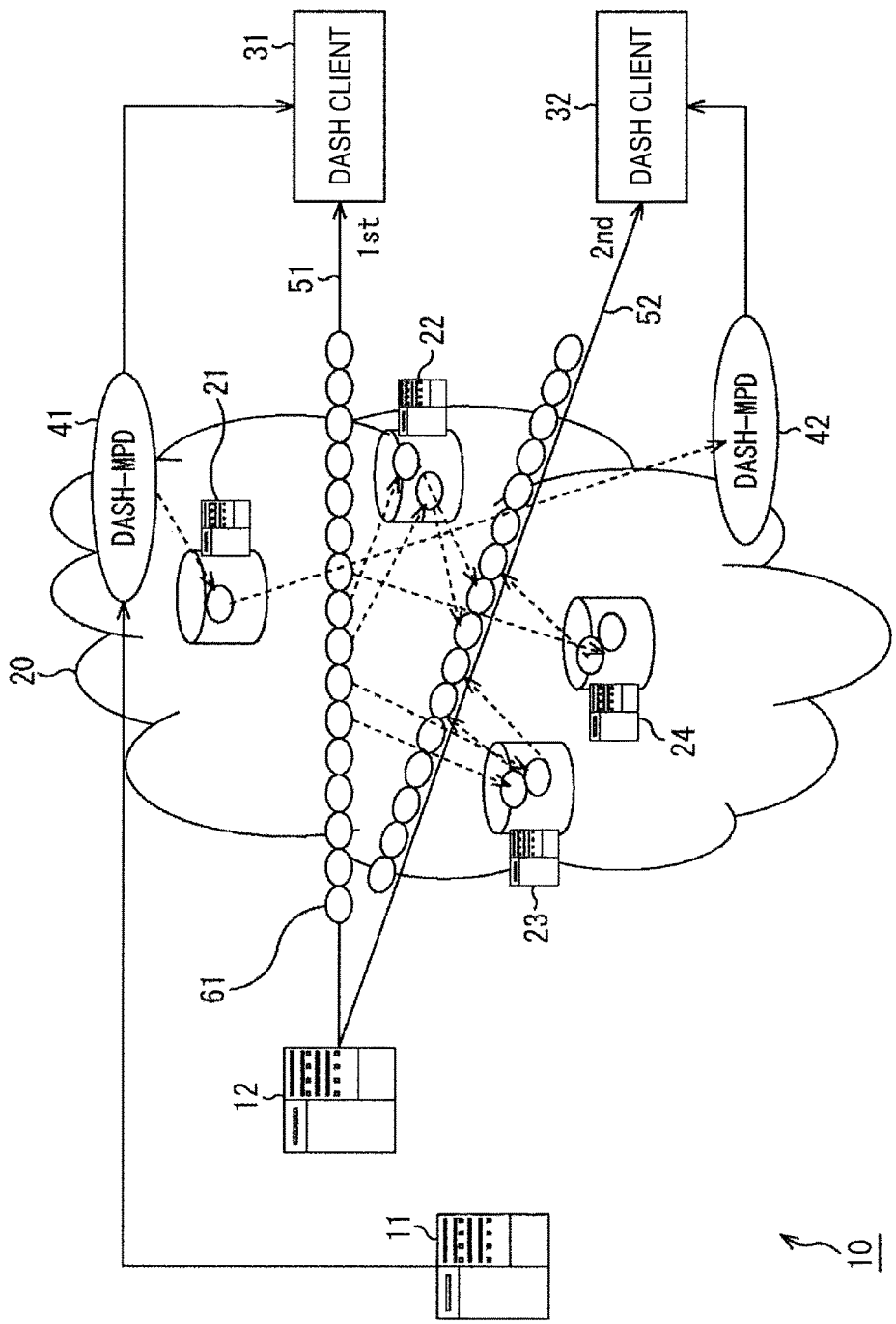
FIG. 1 is a figure which describes an example of a content distribution system in related art.

FIG. 1 is a figure which describes an example of a system distributing a content by DASH. The content distribution system 10 shown in FIG. 1 is a system which distributes content data constituting of images, audio or the like from a server to a client, by using DASH.

As in the example shown in FIG. 1, in this content distribution system 10, a DASH-MPD file and DASH segments are distributed via an entire CDN. That is, first, a DASH MPD server 11 supplies a DASH-MPD file 41 to a DASH client 31 which initially issued an HTTP request, via a CDN 20. This DASH-MPD file 41 is retained in a cache server (DASH cache 21) of the CDN 20.

When the DASH client 31 demands a content, based on the acquired DASH-MPD file 41, a DASH segment streamer 12 supplies DASH segments 61 which are this content to the DASH client 31, via the CDN 20, such as arrow 51. The small ovals in FIG. 1 respectively show the DASH segments which are the segmented content. These DASH segments 61 are also retained in cache servers (DASH cache 22 through to DASH cache 24 or the like) of the CDN 20.

Afterwards, when a DASH client 32 which is another client issues an HTTP request for the same content, the DASH cache 21 of the CDN 20 supplies the retained DASH-MPD file 41 to the DASH client 32 as a DASH-MPD file 42. In this way, the load of the DASH MPD server 11 is reduced. It is needless to say that, in the case where a DASH-MPD file is not cached in the cache servers of the CDN 20, the DASH-MPD file 42 is supplied to the DASH client 32 from the DASH MPD server 11, similar to the case of the DASH client 31.

Also, when the DASH client 32 demands a content, based on the acquired DASH-MPD file 42, the DASH segment streamer 12 supplies the DASH segments 61 which are this content to the DASH client 32, via the CDN 20, such as arrow 52. At this time, in the case where the DASH segments 61 of this content are cached in the cache servers (DASH cache 22 through to DASH cache 24 or the like) of the CDN 20, these DASH segments 61 are supplied to the DASH client 32. In this way, the load of the DASH segment streamer 12 is reduced.

By using such a CDN, a content can be more efficiently distributed.

<DASH>

Figure 2:
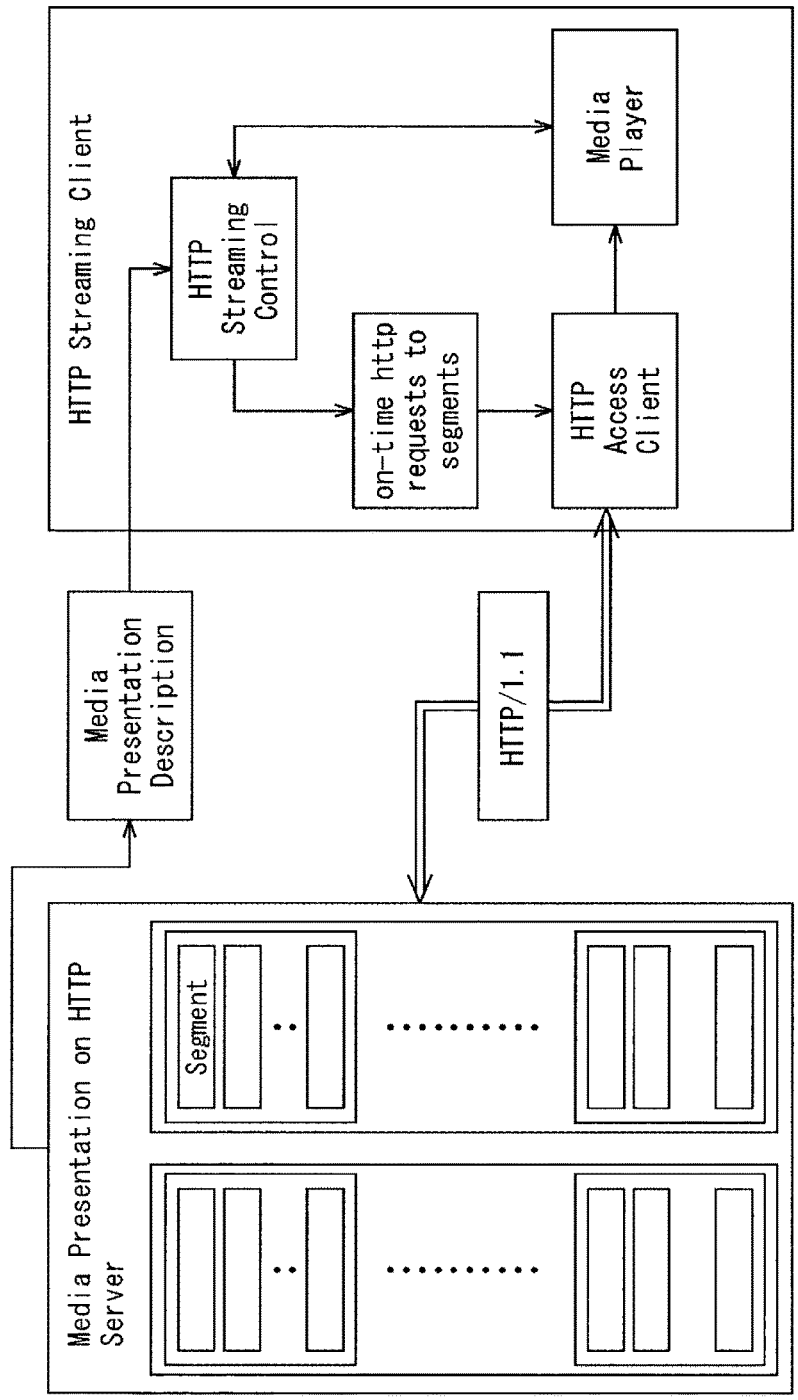
FIG. 2 is a figure which describes an outline of DASH.

The procedure of the transmission of a content by DASH will be described by referring to FIG. 2. First, the client of the side which acquires a content selects an MPD of a desired content, by an application (HTTP streaming Client) such as a browser, and acquires it from a server (Media Presentation on HTTP Server).

When the MPD is acquired, the client acquires DASH segments of the desired content from the server, by analyzing the MPD, and reproduces this.

Figure 3:
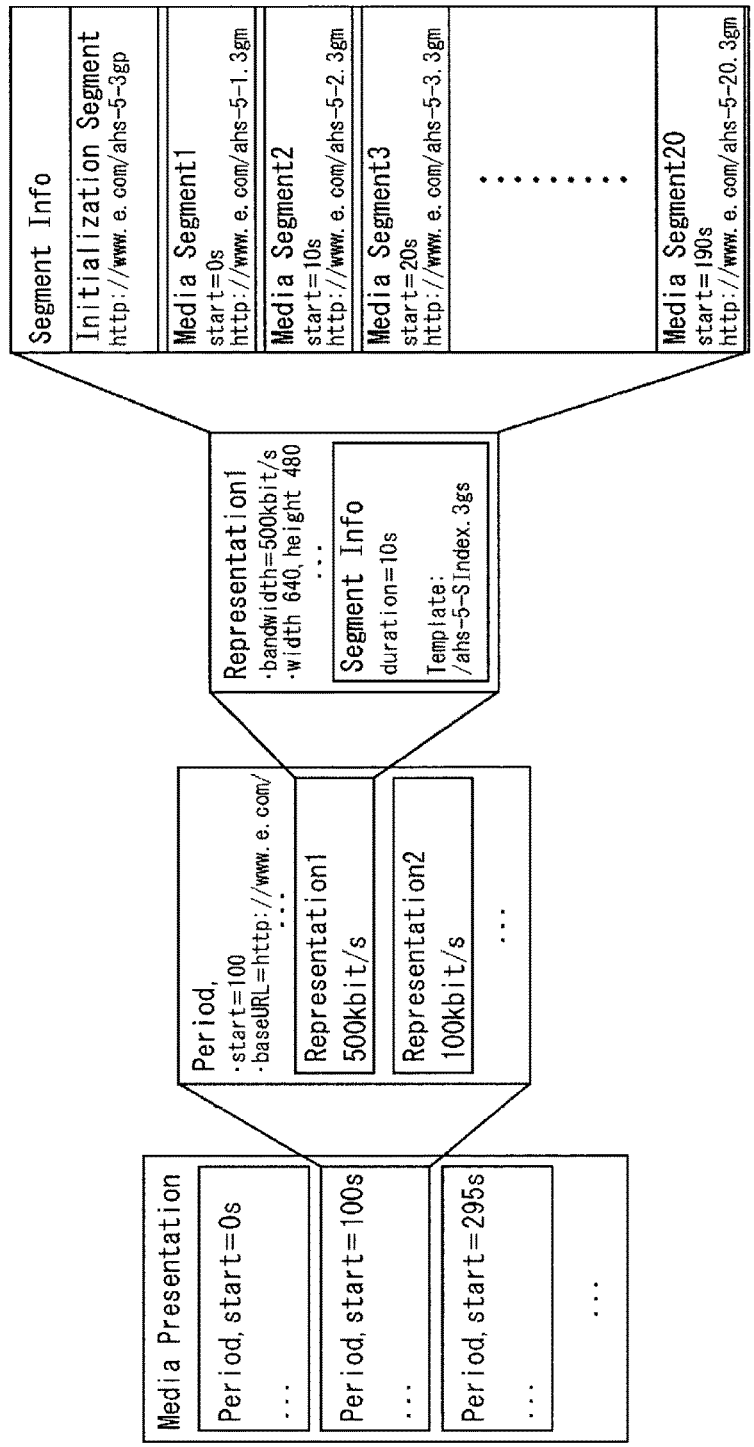
FIG. 3 is a figure which shows a configuration example of an MPD.

The MPD has a configuration such as shown in FIG. 3. In an analysis (parsing) of the MPD, the client selects an optimal part from the Representation attributes included in a Period of the MPD (Media Presentation of FIG. 3).

The client acquires and processes an Initialization Segment by calling a leading Segment of the selected Representation. To continue, the client acquires and reproduces the subsequent Segments.

Figure 4:
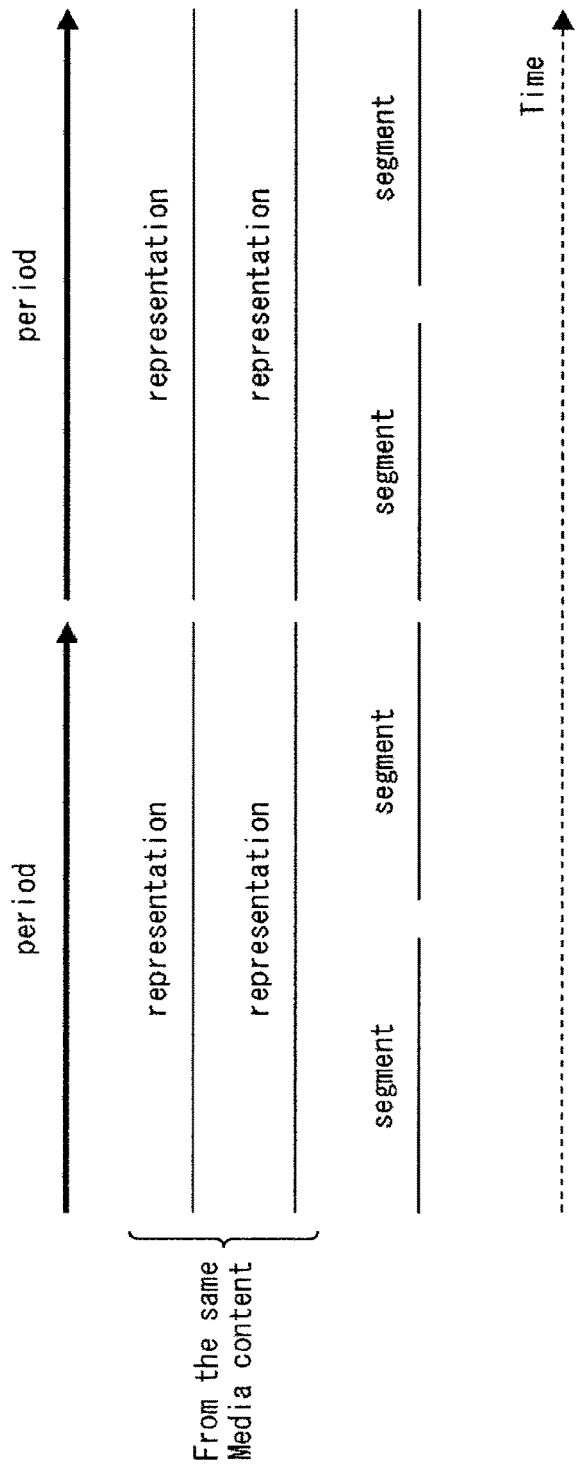
FIG. 4 is a figure which describes a time partition of a content.

Note that, in an MPD, the relationship between a Period, Representation and Segment is such as in FIG. 4. That is, one media content can be managed for each Period, which is a data unit of a time direction, and each Period can be managed for each Segment, which is a data unit of a time direction. Further, a plurality of Representations with different attributes such as bit rates can be constituted for each Period.

Figure 5:
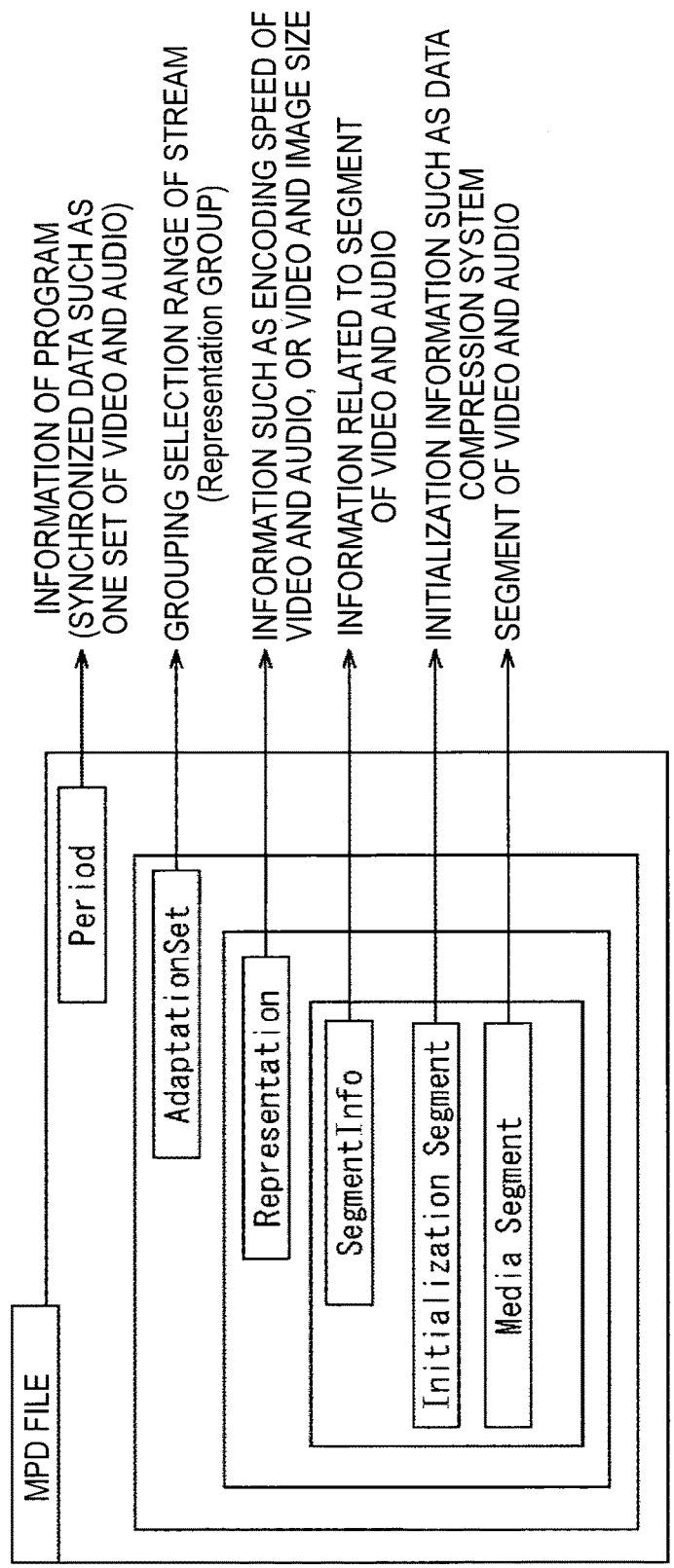
FIG. 5 is a figure which shows an example of a hierarchical structure of a Period or below in an MPD.
Figure 6:
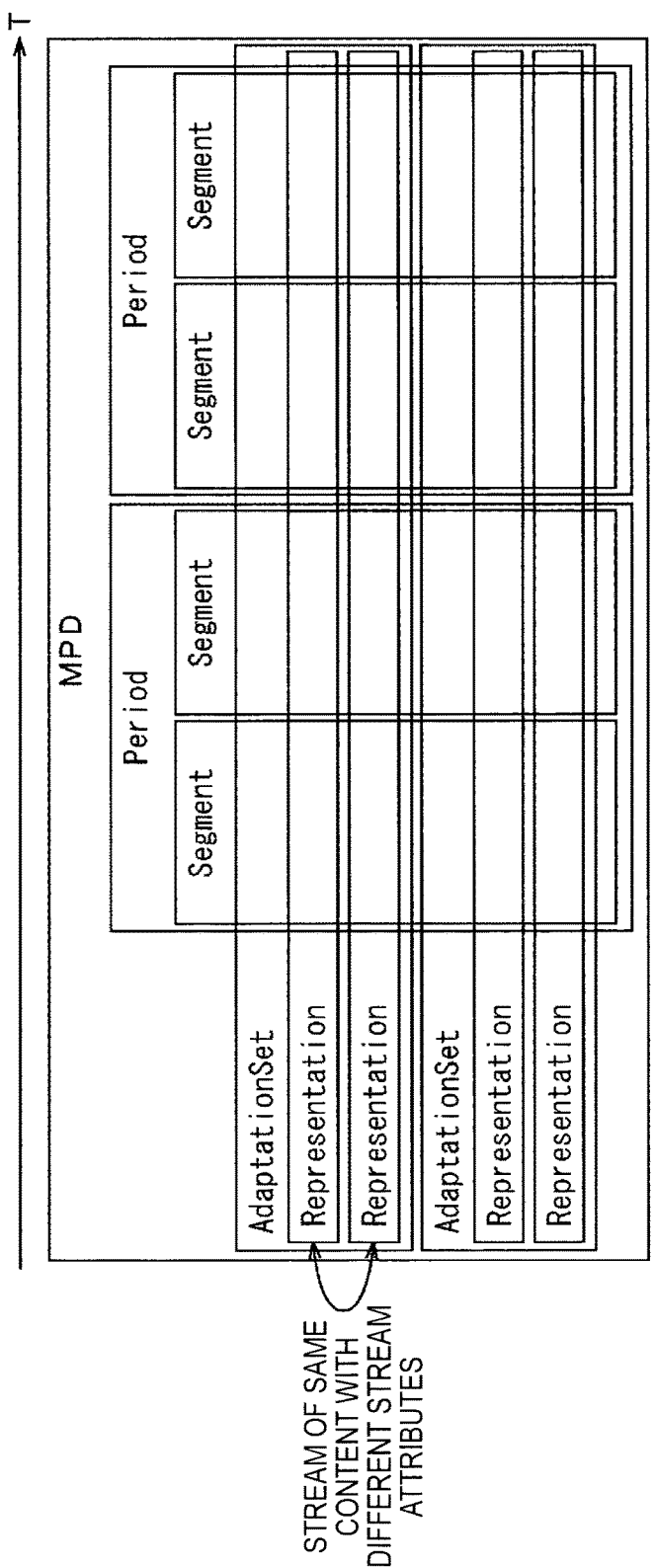
FIG. 6 is a figure which describes a configuration example of an MPD file on a time axis.

Therefore, a file of this MPD (also called an MPD file) has a hierarchical structure such as shown in FIG. 5, in the Period or below. Further, the structure of this MPD becomes such as in the example of FIG. 6 when arranged on a time axis. As is clear from FIG. 6, a plurality of Representations exist for a same Segment. The client can acquire and reproduce appropriate stream data in accordance with a communication environment, its own decode capacity or the like, by appropriately selecting any one of these.

However, a CDN is generally not able to obtain scalability of an extent which is comparable to existing broadcast distribution, from cost restrictions.

While a target described by a Representation is a url of a stream distributed through the internet (Network Interface Controller (NIC)), in the case where (broadcast system) physical layers are mounted for broadcast/multicast such as a Multimedia Broadcast and Multicast Service (MBMS) by the client, there will be cases where content reproduction with a much higher quality can be expected on a transmission path where that received and reproduced through these is guaranteed by a Quality of Service (QoS) (guarantee band/delay or the like) of a broadcast system, at the time when a same live broadcast or the like is distributed on a channel which can be received through these.

Further, it is possible for that using a broadcast for cost to be able to be reasonably distributed. Further, in the case where it becomes a condition such as only being able to be received in a stream exceeding (a lower limit of) a range of a prepared bit rate, for example, by a sudden change of an internet distribution environment (traffic), during reproduction, stream reproduction is stopped. In such a case, an alternative distribution, such as continuing viewing by switching to a stream on a broadcast system transmission path, may become necessary for a user continuing to view this even if in a stream with a lower but rate than that by internet distribution. Therefore, all of the cases in the present scope of DASH have not been able to be supported.

<Extension of an MPD>

Accordingly, the load of a network resource can be reduced, and a multicast and broadcast bearer can be used so as to be able to perform more efficient distribution of a content. More specifically, a stream distributed by the above described broadcast channel can be designated as one Representation. Therefore, an element which describes the parameters for broadcast channel tuning can be arranged, and an extension attribute can be arranged for a file transfer protocol File Delivery over Unidirectional Transport (FLUTE) on a stream distributed by the broadcast channel.

Figure 7:
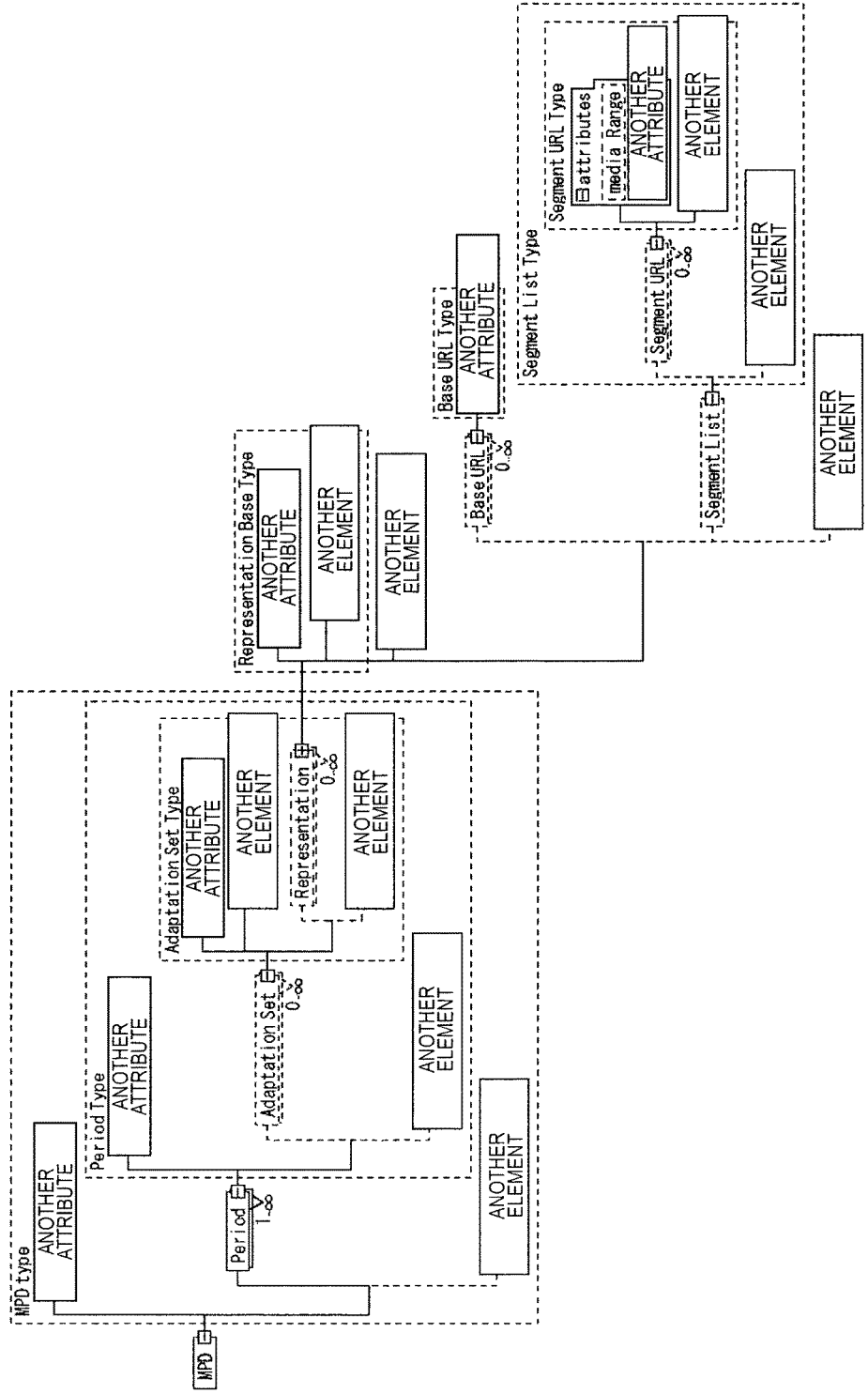
FIG. 7 is a figure which describes an example of a structure of a Representation or below of an MPD.

FIG. 7 is a figure which shows an example of the structure of the Representation or below of an MPD. An address of a file in which segmented stream data is stored is described in the Representation. Specifically, in the case where a plurality of segmented stream data are each individually filed, a sequence of addresses (url information) of each file is described. Further, in the case where the plurality of segmented stream data are collectively filed, an address (Base URL) of this file and a sequence of the range (mediaRange) of each segment in this file are described. Note that, the case of the latter is shown in FIG. 7.

An extension use system for being able to describe an attribute, which represents a same content stream distributed on a broadcast channel, as one Representation, in an MPD will be described hereinafter. In the case where url sequences of a file in which chunked content data is stored, or data of the chunked content, are stored within the file, the sequences of chunked content data constituting a stream are provided by DASH so that these are expressed by the stored sequence of "URL+byte range of the file".

FIG. 8 shows an example in which the structure of the Representation or below shown in FIG. 7 is described in an XML form.

In FIG. 8, the URL of a file, in which an MP4 media of a target is stored, is described in:
MPD/Period/Adaptation Set/Representation/BaseURL
and is represented by:
"http://example.com/counter-10mn_avc_dash.mp4".
Further,
MPD/Period/AdaptationSet/Representation/SegmentList/SegmentURL/@mediaRange="795-83596"
of FIG. 8 shows that the byte range from the 795th byte until the 83596th byte in this file is a 1st Segment (segmented stream data).

Further,
MPD/Period/Adaptation Set/Representation/Segmen-tList/SegmentURL/@mediaRange="83597-166046"
of FIG. 8 shows that the byte range from the 83597th byte until the 166046th byte in this file is a 2nd Segment.

When these Segments are acquired, the client designates:
"http://example.com/counter-10mn_avc_dash.mp4"
which is the url of the file, and issues an HTTP request which designates this byte range to the Range header of the HTTP request. That is, as shown in FIG. 9A, in an HTTP request for acquiring the initial segment, the client designates:
http://example.com/counter-10mn_avc_dash.mp4
as the file url, and additionally designates "795-83596" as the byte range.

Further, as shown in FIG. 9B, in an HTTP request for acquiring the second segment, the client designates:
http://example.com/server/counter-10mn_aacdash.mp4
as the file url, and additionally designates "83597-166046" as the byte range.

In the case where data of these segments are stored in a file transferred by FLUTE in an IP multicast stream on a broadcast channel, it may be necessary for the above described expression form to be extended so as to address an IP multicast stream of the broadcast channel.

Therefore, a ServiceLocation element, which stores a tuning parameter (DeliverySystemAttributes) and an IP multicast address (IPMulticastAddress), is introduced as a new element for acquiring the IP multicast stream transferred by the segment file group. That is, in this case, such as in the example shown in FIG. 10, a serviceLocationAttribute Url attribute, which stores a url of a serviceLocation file in which this ServiceLocation element is stored as a route element, is arranged (described) in a BaseURL of an MPD.

Note that, an XML Schema of the ServiceLocation file designated by the serviceLocationAttributeUrl attribute is described such as in the example shown in FIG. 11.

Figure 12:
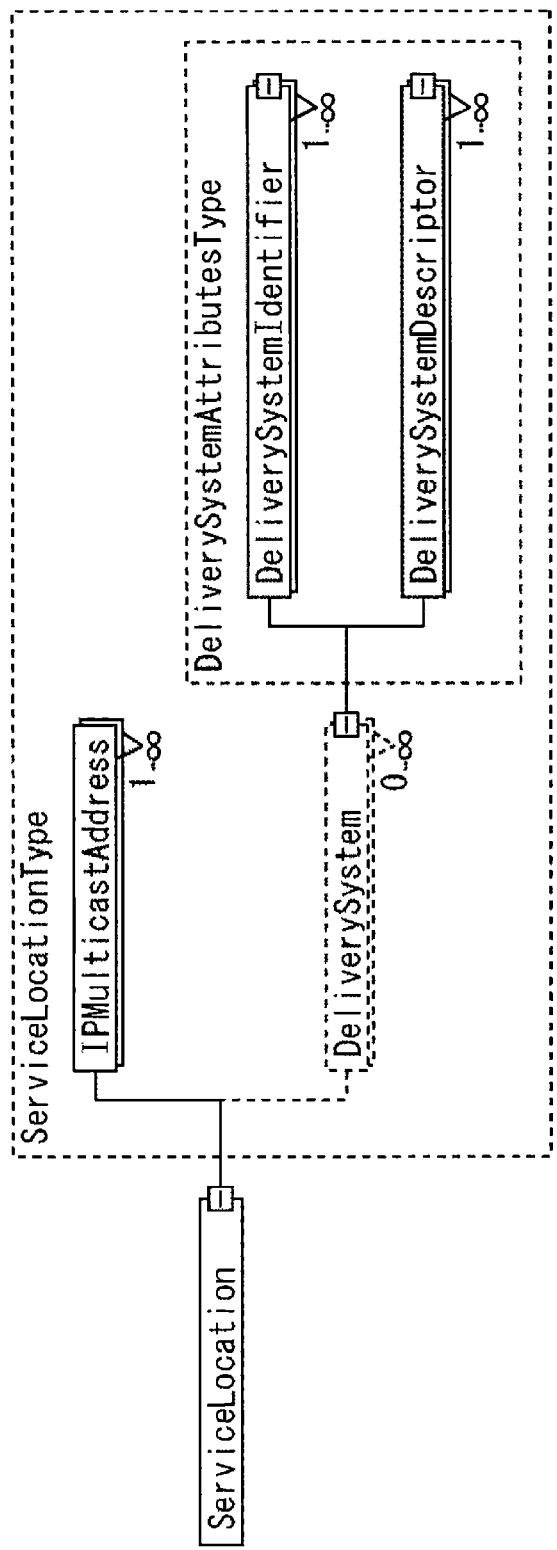
FIG. 12 is a figure which shows a data structure of a ServiceLocation element designated by a serviceLocationAttributeUrl attribute.

FIG. 12 is a figure which shows a configuration example of a ServiceLocation element in such an extended MPD.

As shown in FIG. 12, an identifier, which identifies a format of a data structure identifying the stream (broadcast/multicast stream) for multicast distribution or broadcast distribution of an MBMS, is stored in a DeliverySystemIdentifier of a DeliverySystemAttributeType. For example, in the case of distribution using an "MBMS", which is technology for efficiently distributing multimedia content such as video or music by an existing network, in particular, a 3G mobile telephone network based on W-CDMA, or a 2.5G mobile telephone network based on GSM (registered trademark)/EDGE, an identifier "ID_MBMS" which shows the MBMS is stored (described) in the DeliverySystemIdentifier.

Further, a data structure of a parameter, or this parameter, for acquiring a broadcast/multicast stream provided for each distribution system identified by the above described DeliverySystemIdentifier, is stored (described) in a DeliverySystemDescriptor of the DeliverySystemAttributeType.

In the case where "ID_MBMS" is stored (described) in the DeliverySystemIdentifier, for example, a "User Service Description" structure provided in the MBMS is stored (described), such as shown in FIG. 13.

(Extension of an FDT)

Next, an extension of an FDT will be described. A file group is conveyed, by a FLUTE protocol, on an IP packet stream having a multicast address designated by a Service-Location/IPMulticastAddress element, from among the IP packet streams transferred on an MBMS multicast stream by information stored in the above described ServiceLocation/DeliverySystem element.

Figure 14:
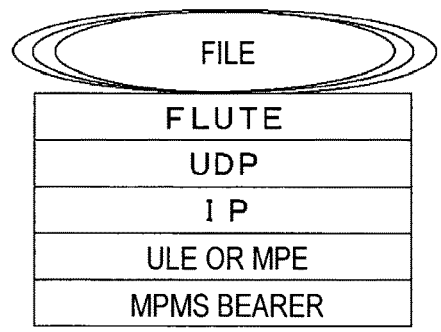
FIG. 14 is a figure which shows a hierarchical structure of a FLUTE protocol.

FIG. 14 shows a hierarchy of a FLUTE protocol. FLUTE is a protocol which transfers a file on an IP packet stream, and has a protocol hierarchy such as in the example shown in FIG. 14. Note that, in FIG. 14, the case is shown where a FLUTE packet is conveyed on an MBMS bearer designated by the above described DeliverySystemAttributes.

In a FLUTE protocol, file attributes can be described for each of the files conveyed by the FLUTE packet. The file attributes are described in a File Delivery Table (FDT) (FDT-Instance element).

Figure 15:
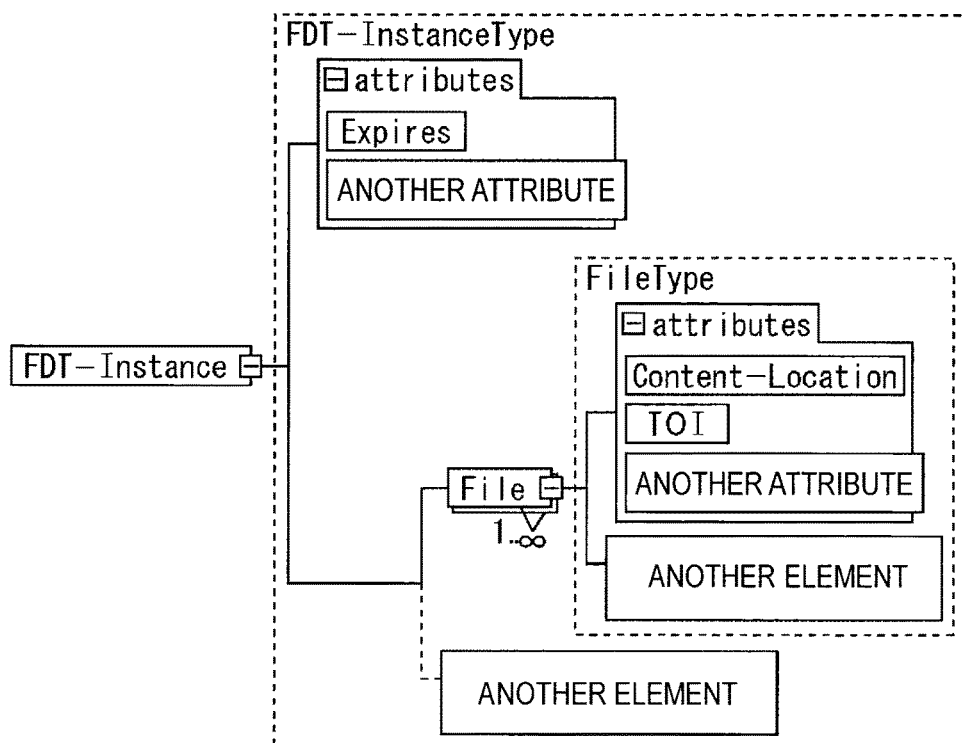
FIG. 15 is a figure which shows a data structure of an FDT.

FIG. 15 shows an example of a data structure of an FDT. The indispensable file attributes in an FDT are the following three types.

FDT-Instance/Expires (expiration date of the FDT)

FDT-Instance/File/Content-Location (URL of a file to be transferred)

FDT-Instance/File/TOI (Transport Object Identifier, identifier of an indispensable configuration chunk group upon performing FLUTE transfer)

In a FLUTE protocol, it is initialized at the stage where all of the files having a same TOI are received, and it becomes possible to access to these as files designated by a URL of a Content-Location. Therefore, in the case where the size of one file with a long reproduction time is extremely large, such as VoD content of a movie or the like, time of some extent may become necessary until this entire file can be accessed by reconstructing at the reception side.

In contrast to this, in streaming using DASH, parts of the file can be acquired and reproduced in segment units by a mediaRange designation of individual HTTP requests, even if the size of the file of VoD content of a target is large. Therefore, it is desirable for the units of a file FLUTE transferred on a broadcast channel to be acquired and reproduced in these segment units.

However, a part of the file, such as the sequence of BASEURL+SegmentURL mediaRange of MPD, is not able to be expressed by only the presently provided Content-Location element of FDT. In the case where Segments of an MPD of DASH are a part of the file transferred by FLUTE (a byte sequence designated by a file url+byte range), while a method can be considered which makes this byte sequence independent as a file, and accesses the Segments corresponding to this url by allocating a URL of this file, the configuration of the MPD file of net distribution will change, in order for this to be broadcast distributed, and an MPD generated for net distribution will not be realistic since a configuration change of a segment file and rewriting of a corresponding MPD will occur (additional overhead from the viewpoint of operation occurring), at the same time as being used with broadcast distribution. Accordingly, an extension is performed for the FDT so that a part of the file can be expressed.

FIG. 16 shows a data structure of an extended FDT. That is, a new range attribute is introduced, for the FDT, so that the Content-Location, and additionally the byte range within the file designated by a url of this Content-Location, can be designated. The definition of a range-specifier (RFC2616.section.14.35.1) is applied to the syntax of the range attribute. That expressed by the range-specifier stored in a range header an HTTP request such as shown below can be stored as it is in the range attribute. That is, a Period/AdaptationSet/Representation/SegmentList/SegmentURL/@mediaRange of an MPD can be diverted as it is to the range attribute.

<Adaptive Control>

However, even if a multicast or broadcast bearer is used by extending an MPD such as described above, it will not mean that multicast distribution or broadcast distribution is usually the best. For example, in the case where there are few clients demanding a content, in the case where there are few usable resources of multicast distribution or broadcast distribution or the like, it can be considered that a sufficient cost benefit will not be able to be obtained, and the load of a network resource will not be able to be sufficiently reduced.

Accordingly, in order to more efficiently perform distribution of a content, unicast distribution and multicast distribution or broadcast distribution are used together, and the use of each distribution is more adaptively controlled.

For example, an MPD configurator is prepared which collects a manifest file (MPD) of a DASH adaptive streaming format, and the MPD is rewritten (updated) by allocating (releasing) a broadcast channel in accordance with a demand amount (demand number) from the DASH client.

In this way as described above, a mobile broadcast channel such as MBMS can be used as an alternative distribution pass capable of stream switching in adaptive streaming, while optimally maintaining a broadcast distribution resource allocation.

1. First Embodiment

<Content Distribution System>

Figure 17:
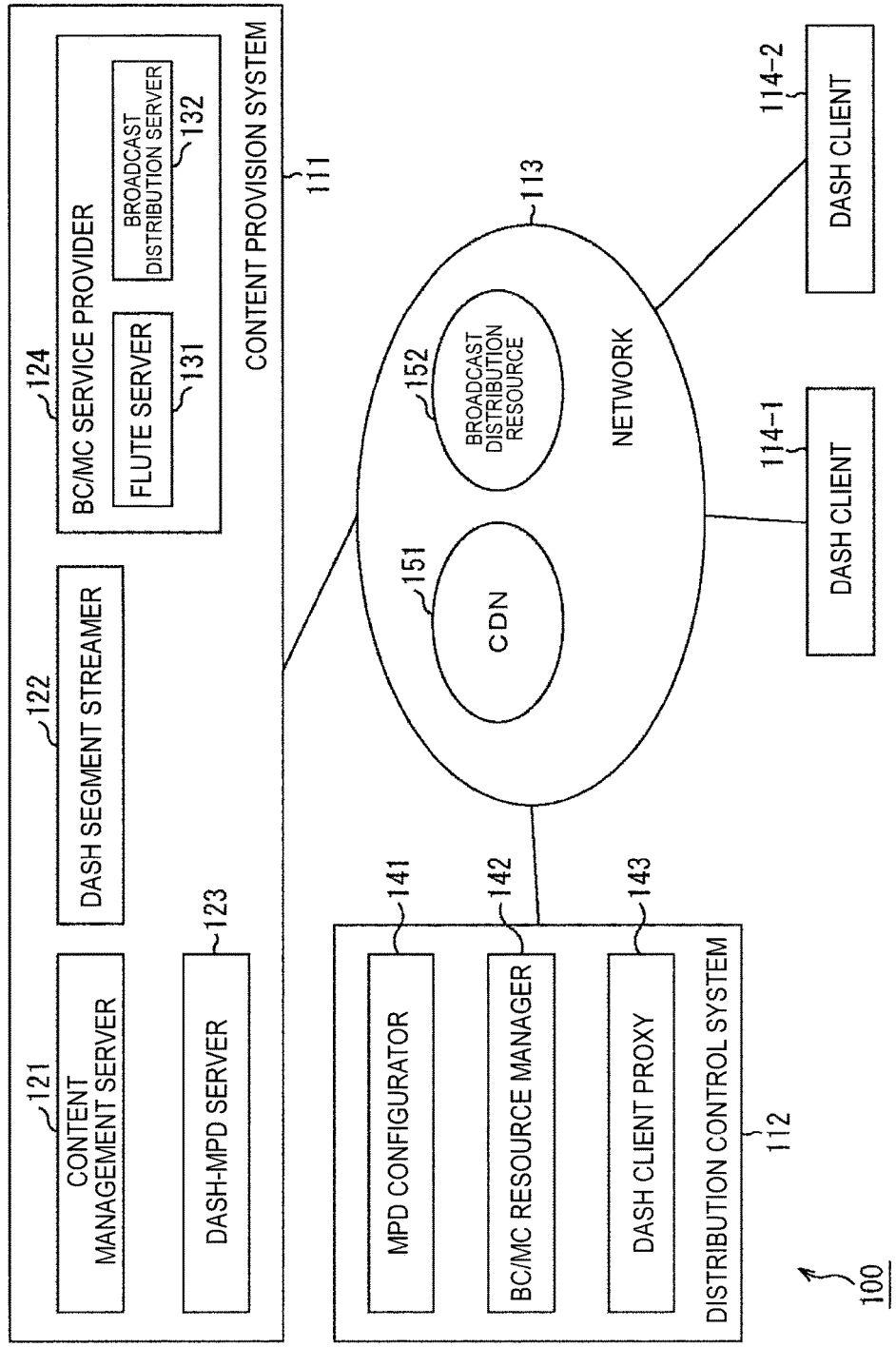
FIG. 17 is a block diagram which shows a main configuration example of a content distribution system.

FIG. 17 is a block diagram which shows a main configuration example of a content distribution system which is an embodiment of a content supply system applicable to the present disclosure.

The content distribution system 100 shown in FIG. 17 is a system which supplies a content from a server to a client. As shown in FIG. 17, the content distribution system 100 has a content provision system 111, a distribution control system 112, a network 113, and a DASH client 114-1 and a DASH client 114-2. The content distribution system 100 is a system which transmits a content from the content provision system 111 to the DASH client 114-1 or the DASH client 114-2.

The content provision system 111 is a system which mainly performs processes related to the provision of a content. The content provision system 111 supplies a content managed by itself to the DASH client 114-1 or the DASH client 114-2 which is a demand source, via the network 113, in accordance with a demand from the DASH client 114-1 or the DASH client 114-2.

The distribution control system 112 is a system which performs a control process related to a distribution method of this content.

The network 113 is constituted of an arbitrary wired, wireless or both network, for example, such as the internet or a LAN. In FIG. 17, while the network 113 is shown as one network, the configuration of the network 113 is arbitrary, and may be constituted by a plurality of networks. Further, any type of device or system may be connected to the network 113. In the case of the example of FIG. 17, the content provision system 111, the distribution control system 112, and the DASH client 114-1 and the DASH client 114-2 are connected to the network 113.

The DASH client 114-1 and the DASH client 114-2 are respectively connected to the network 113, and perform processes related to the acquisition of a content. Note that, in the case where it may not be necessary to mutually distinguish and describe the DASH client 114-1 and the DASH client 114-2, they will simply be called a DASH client 114. In FIG. 17, while two DASH clients 114 are shown, the number of the DASH clients 114 is arbitrary.

The DASH client 114 may be any type of device, if it is a device which includes a communication function performing communication via the network 113, and is capable of reproducing streaming data of a content constituted by video images or audio supplied from the content provision system 111. For example, it may be a portable-type terminal apparatus (mobile device) such as a mobile phone device, a note-type personal computer, a smartphone, or a tablet-type information processing apparatus. It is needless to say that the DASH client 114-1 and the DASH client 114-2 may be various types of mutually different devices.

Further, the DASH client 114 may be connected by wired communication, or may be connected by wireless communication, to the network 113.

As shown in FIG. 17, the content provision system 111 has, for example, a content management server 121, a DASH segment streamer 122, a DASH-MPD server 123, and a BC/MC service provider 124.

The content management server 121 is a server which performs generation/management of a content (for example, including a live broadcast stream).

The DASH segment streamer 122 is a server which generates DASH segments from a content managed by the content management server 121. If it is the case where individual segments are independently generated as files, there will be cases where they are managed as regions designated in a file URL+range without being separated as files. In the case of net distribution, the DASH segment streamer 122 becomes an HTTP server which distributes segments.

The DASH-MPD server 123 is a server which generates an MPD based on a url (+range) of the DASH segments managed by the DASH segment streamer 122 and metadata of a content managed by the content management server 121. In the case of net distribution, the DASH-MPD server 123 becomes an HTTP server which distributes an MPD. In the case of broadcast distribution or multicast distribution, the DASH-MPD server 123 sends an MPD to a FLUTE server 131, which will be described later.

The BC/MC service provider 124 is a server which broadcast distributes an MPD and segments, which have been broadcast distribution requested from the DASH client proxy 143, which will be described later, by a broadcast distribution resource 152 (for example, an MBMS bearer or the like). As shown in FIG. 17, the BC/MC service provider 124 has, for example, a FLUTE server 131 and a broadcast distribution server 132.

The FLUTE server 131 is a server which multicasts DASH segments managed by the DASH segment streamer 122 to the DASH client 114 by a FLUTE protocol. The FLUTE server 131 performs generation of an extended FDT, generation of a FLUTE packet (ALC packet or the like) from the segments or the like. In the case of net distribution, the FLUTE server 131 becomes a multicast server which multicast distributes a generated FDT or FLUTE packet to the DASH client 114. In the case of broadcast distribution, the FLUTE server 131 sends a generated FDT and FLUTE packet to the broadcast distribution server 132.

The broadcast distribution server 132 is a server which broadcast distributes an FDT, ALC packet or the like generated by the FLUTE server 131.

As shown in FIG. 17, the distribution control system 112 has, for example, an MPD configurator 141, a BC/MC resource manager 142, and a DASH client proxy 143.

The MPD configurator 141 determines whether or not to use multicast distribution or broadcast distribution for a supply of a content, and in the case where it is determined to use multicast distribution or broadcast distribution, control information related to unicast distribution of this content is updated so as to use this multicast distribution or broadcast distribution for a supply of the content.

More specifically, the MPD configurator 141 reserves and releases a multicast resource for the BC/MC resource manager 142, based on an MPD which is an example of this control information, sent from the DASH client 114, and rewrites the MPD and sends it to the client such as described above in <0. Outline>, so that this segment stream which is an example of a content can be acquired from the multicast channel. A reserve and release judgement of the resource is performed based on a cost effect calculation used with a BC/MC resource.

The BC/MC resource manager 142 is a server which reserves and releases a multicast resource, based on a request from the MPD configurator 141. An empty condition of a broadcast/multicast resource is reported to the MPD configurator 141, and a response is performed for a resource reserve and release demand.

The DASH client proxy 143 is a proxy server which behaves as the DASH client 114 for the DASH segment streamer 122. It is a server which acquires segments instead of the DASH client 114, by monitoring an MPD rewritten by the MPD configurator 141, performs protocol conversion (conversion from HTTP acquisition to FLUTE multicast distribution) for multicast distribution or broadcast distribution (BC/MC), and requests multicast distribution or broadcast distribution to the BC/MC service provider 124.

As shown in FIG. 17, the network 113 has, for example, a CDN 151 and a broadcast distribution resource 152. The broadcast distribution resource 152 is constituted by, for example, an MBMS bearer or the like. In FIG. 17, while one CDN 151 and broadcast distribution resource 152 are each shown in the network 113, the number of the CDN 151 and the broadcast distribution resource 152 included in the network 113 is arbitrary, and may be a plurality.

It is needless to say that the content provision system 111 may have a server other than that described above. Further, in FIG. 17, while the content provision system 111 is shown such as connected to the network 113, each of the servers constituting the above described content provision system 111 (the content management server 121 through to the BC/MC service provider 124 (the FLUTE server 131 and the broadcast distribution server 132) or the like) are actually directly or indirectly connected to the network 113.

It is needless to say that the configuration of the content provision system 111 is arbitrary, and each of the above described servers or other devices may be mutually connected, or may be connected any way to the network 113, if a content can be distributed to the DASH client 114 via the network 113. Further, in FIG. 17, while one of each is shown, the number of the content management server 121 through to the BC/MC service provider 124 (FLUTE server 131 and broadcast distribution server 132) is arbitrary, and may be a plurality.

It is needless to say that the distribution control system 112 may have servers or the like other than those described above. Further, in FIG. 17, while the distribution control system 112 is shown such as connected to the network 113, each of the servers constituting the above described distribution control system 112 (the MPD configurator 141 through to the DASH client proxy 143 or the like) are actually directly or indirectly connected to the network 113.

It is needless to say that the configuration of the distribution control system 112 is arbitrary, and each of the above described servers or other devices may be mutually connected, or may be connected any way to the network 113, if content distribution can be controlled via the network 113. Further, in FIG. 17, while one of each is shown, the number of the MPD configurator 141 through to the DASH client proxy 143 is arbitrary, and may be a plurality.

In addition, for example, the MPD configurator 141 through to the DASH client proxy 143 (or a part of these) may be formed on the content distribution side (that is, constituting the content provision system 111).

Further, for example, the network 113 may be constituted of a plurality of networks, and the MPD configurator 141 through to the DASH client proxy 143 (or a part of these) may be formed as relay devices between these networks.

In addition, for example, the MPD configurator 141 through to the DASH client proxy 143 (or a part of these) may control only a prescribed part of the content distribution performed via the network 113. For example, the MPD configurator 141 through to the DASH client proxy 143 (or a part of these) may take charge of the content distribution performed in a part of the network 113 time-wise or positionally (regionally).

For example, the DASH client 114 is a device which connects to the internet or the like via a base station of a public wireless communication line, such as a mobile phone device or a smartphone, and the MPD configurator 141 through to the DASH client proxy 143 (or a part of these) may be formed in this base station, and may control only content distribution performed via this base station.

In this case, the MPD configurator 141 adaptively controls the allocation of a resource of multicast distribution or broadcast distribution, and updates an MPD, in accordance with the amount of content distribution demands from the DASH client 114 connected to this base station.

Further, for example, the DASH client 114 is a device which connects to the internet or the like via an access point (or a femtocell base station or the like) of a wireless LAN installed in a home, shop or the like, and the MPD configurator 141 through to the DASH client proxy 143 (or a part of these) may be formed in this access point, and may control only content distribution performed via this access point.

In this case, the MPD configurator 141 adaptively controls the allocation of a resource of multicast distribution or broadcast distribution, and updates an MPD, in accordance with the amount of content distribution demands from the DASH client 114 connected to this access point (that is, the DASH client 114 connected to this wireless LAN).

In addition, for example, the MPD configurator 141 may control only content distribution for a prescribed DASH client 114 registered in advance. That is, in this case, the MPD configurator 141 adaptively controls the allocation of a resource of multicast distribution or broadcast distribution, and updates an MPD, in accordance with the amount of content distribution demands from the prescribed DASH client 114 registered in advance.

Further, for example, the MPD configurator 141 through to the DASH client proxy 143 (or a part of these) may be formed within a DASH client 114, and may adaptively control the allocation of a resource of multicast distribution or broadcast distribution, and may update an MPD, in accordance with the amount of content distribution demands of each of the applications executed in this DASH client 114.

In this way as described above, the MPD configurator 141 can adaptively control the allocation of a resource of multicast distribution or broadcast distribution, in accordance with a content distribution demand amount in a part time-wise, positionally (regionally) or client-wise, and not the entire network 113. That is, it can more appropriately correspond to local changes of the demand amount. That is, content distribution can be more efficiently performed.

<Physical Configuration>

Figure 18:
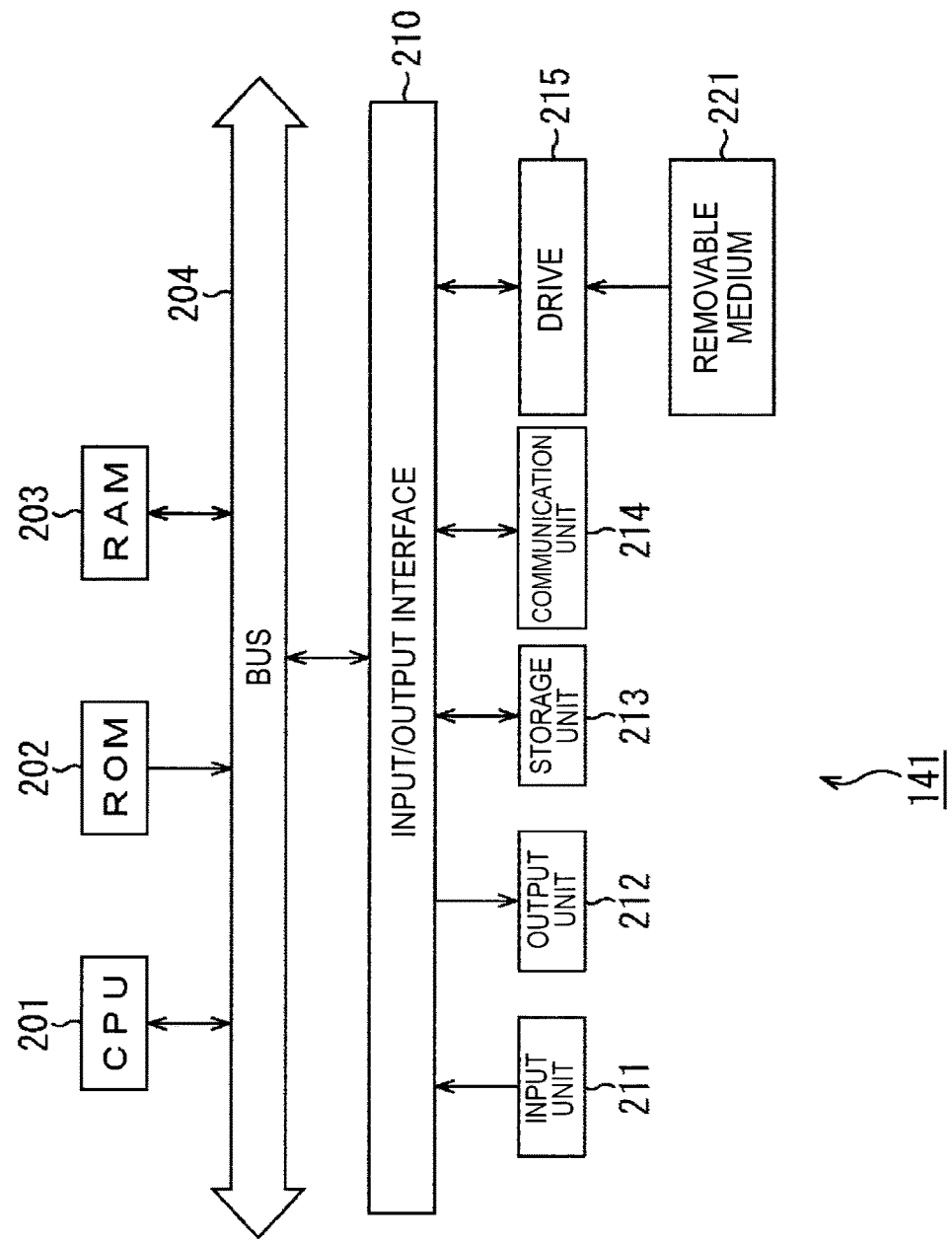
FIG. 18 is a block diagram which shows an example of a physical configuration of an MPD configurator.

Next, a configuration example of each of the devices constituting the content distribution system 100 will be described. FIG. 18 is a block diagram which shows a physical configuration example of the MPD configurator 141.

As shown in FIG. 18, the MPD configurator 141 has a Central Processing Unit (CPU) 201, a Read Only Memory (ROM) 202, and a Random Access Memory (RAM) 203. These CPU 201, ROM 202 and RAM 203 are mutually connected via a bus 204.

An input/output interface 210 may also be connected to the bus 204. An input unit 211, an output unit 212, a storage unit 213, a communication unit 214 and a drive 215 are connected to the input/output interface 210.

The input unit 211 is constituted, for example, by a keyboard, mouse, microphone, touch panel or the like. The output unit 212 is constituted, for example, by a display, speaker, output terminal or the like. The storage unit 213 is constituted, for example, by a hard disk, a RAM disk, a non-volatile memory or the like. The communication unit 214 is constituted, for example, by a network interface. The drive 215 drives a removable medium 221 such as a magnetic disk, an optical disk, a magneto-optical disk or a semiconductor memory.

It is needless to say that the configuration of the MPD configurator 141 is arbitrary, and is not limited to the example of FIG. 18. For example, the MPD configurator 141 may have a configuration other than the configuration shown in FIG. 18.

Note that, the content management server 121, the DASH segment streamer 122, the DASH-MPD server 123, the BC/MC service provider 124 (the FLUTE server 131 and the broadcast distribution server 132), the BC/MC resource manager 142, the DASH client proxy 143 and the DASH client 114 may each have a configuration the same as that of the MPD configurator 141. That is, hereinafter, the case which describes a physical configuration of these devices will be described by referring to FIG. 18. It is needless to say that the configuration of these devices is arbitrary the same as the case of the MPD configurator 141, and is not limited to the example of FIG. 18. These devices (or a part of the devices) which include the MPD configurator 141 may have a configuration different to that of the other devices.

<Functional Configuration>

Figure 19:
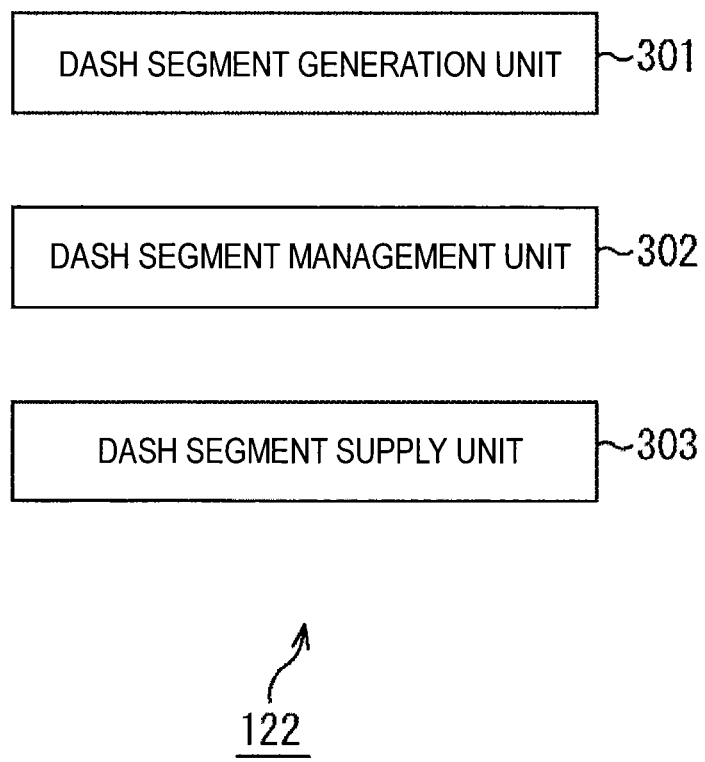
FIG. 19 is a function block diagram which shows an example of the functions of a DASH segment streamer.
Figure 26:
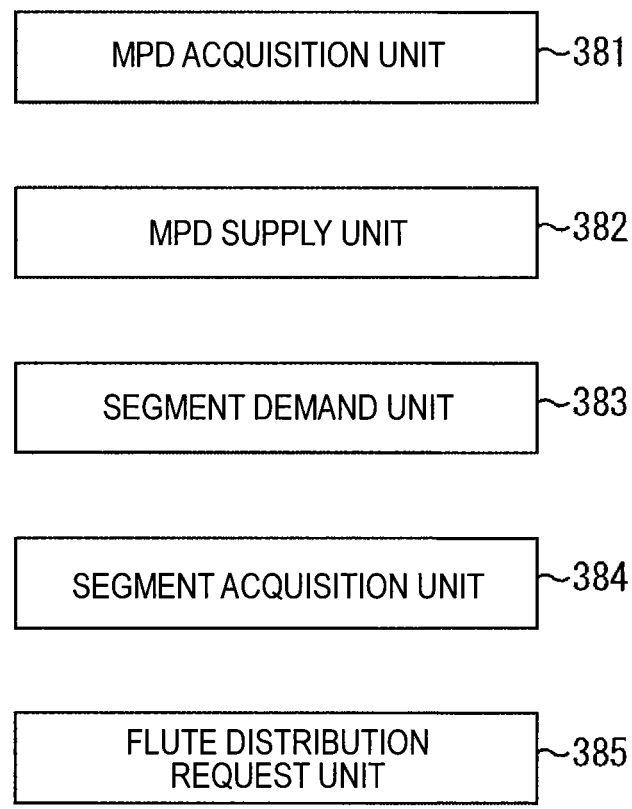
FIG. 26 is a function block diagram which shows an example of the functions of a DASH client proxy.

Next, an example of the functions of each of the devices constituting the content distribution system 100 will be described by referring to FIG. 19 through to FIG. 26. FIG. 19 through to FIG. 26 are function block diagrams for describing the functions of each of the devices. Each of the function blocks shown in FIG. 19 through to FIG. 26 represent the functions implemented by having the CPU 201 of each of the devices execute programs or the like read from the ROM 202 or the storage unit 213 by arbitrarily using the RAM 203 or the like.

FIG. 19 is a figure which shows a configuration example of the main function blocks of the DASH segment streamer 122. As shown in FIG. 19, the DASH segment streamer 122 has, for example, a DASH segment generation unit 301, a DASH segment management unit 302, and a DASH segment supply unit 303.

The DASH segment generation unit 301 acquires content data managed by the content management server 121, via the communication unit 214 of the DASH segment streamer 122, and generates DASH segments from this acquired content data.

The DASH segment management unit 302 stores the DASH segments generated by the DASH segment generation unit 301 in the storage unit 213 of the DASH segment streamer 122, and manages them.

The DASH segment supply unit 303 reads the DASH segments, stored in the storage unit 213 of the DASH segment streamer 122 and managed by the DASH segment management unit 302, which have been demanded from an external unit (for example, the DASH client 114, the DASH client proxy 143 or the like) via the communication unit 214 of the DASH segment streamer 122, and supplies these read DASH segments to a demand source via the communication unit 214 of the DASH segment streamer 122.

It is needless to say that the DASH segment streamer 122 can have arbitrary function blocks. For example, it can have function blocks other than the example shown in FIG. 19.

Figure 20:
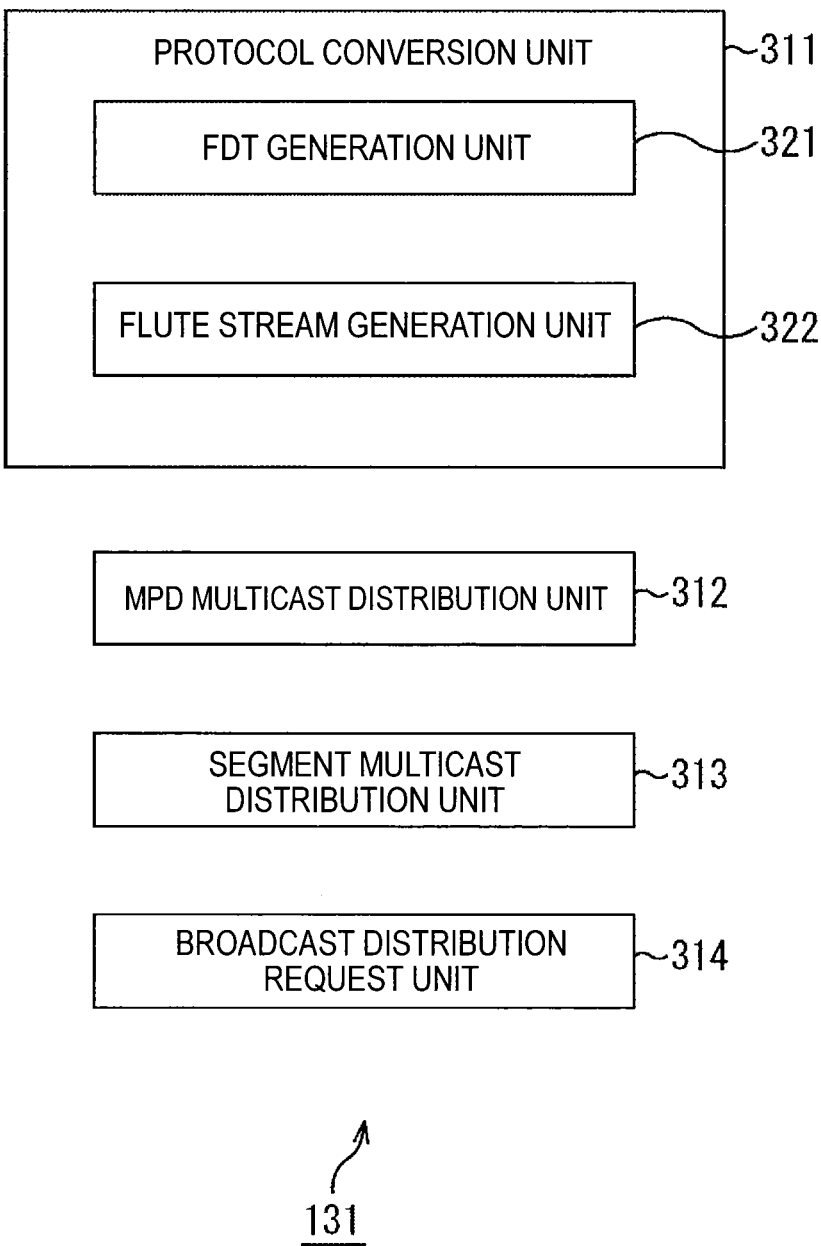
FIG. 20 is a function block diagram which shows an example of the functions of a FLUTE server.

FIG. 20 is a figure which shows a configuration example of the main function blocks of the FLUTE server 131. As shown in FIG. 20, the FLUTE server 131 has, for example, a protocol conversion unit 311, an MPD multicast distribution unit 312, a segment multicast distribution unit 313, and a broadcast distribution request unit 314.

The protocol conversion unit 311 converts a protocol of data supplied from an external unit (for example, the DASH client proxy 143 or the like) via the communication unit 214 of the FLUTE server 131 into a protocol for multicast distribution or broadcast distribution. More specifically, the protocol conversion unit 311 converts data of a supplied DASH protocol into data of a FLUTE protocol. For example, the protocol conversion unit 311 generates an FDT and FLUTE packet from an MPD and DASH segments.

As shown in FIG. 20, the protocol conversion unit 311 has, for example, an FDT generation unit 321 and a FLUTE stream generation unit 322.

The FDT generation unit 321 generates an extended FDT, such as described above in <0. Outline>.

The FLUTE stream generation unit 322 generates a FLUTE packet such as described above in <0. Outline>.

The MPD multicast distribution unit 312 multicast distributes an MPD, via the communication unit 214 of the FLUTE server 131. That is, the MPD multicast distribution unit 312 performs multicast distribution of an MPD. At this time, the MPD multicast distribution unit 312 performs multicast distribution of an MPD to an external unit (for example, the DASH client 114 or the like), by using the broadcast distribution resource 152 (resource for multicast distribution) secured by the BC/MC resource manager 142.

The segment multicast distribution unit 313 multicast distributes DASH segments, via the communication unit 214 of the FLUTE server 131. That is, the segment multicast distribution unit 313 multicast distributes an FDT and FLUTE packet generated by the protocol conversion unit 311. At this time, the segment multicast distribution unit 313 performs multicast distribution to an external unit (for example, the DASH client 114 or the like) by using the broadcast distribution resource 152 (resource for multicast distribution) secured by the BC/MC resource manager 142.

In the case where an FDT and FLUTE packet are to be broadcast distributed, the broadcast distribution request unit 314 performs a broadcast distribution request to the broadcast distribution server 132, via the communication unit 214 of the FLUTE server 131. At this time, the broadcast distribution request unit 314 supplies the FDT and FLUTE packet to be broadcast distributed to the broadcast distribution server 132.

It is needless to say that the FLUTE server 131 can have arbitrary function blocks. For example, it can have function blocks other than the example shown in FIG. 20.

FIG. 21 is a figure which shows a configuration example of the main function blocks of the broadcast distribution server 132. As shown in FIG. 21, the broadcast distribution server 132 has, for example, a broadcast distribution unit 331.

The broadcast distribution unit 331 acquires a broadcast distribution request supplied by an external unit (for example, the FLUTE server 131 or the like) via the communication unit 214 of the broadcast distribution server 132, and broadcast distributes a similarly supplied FDT and FLUTE packet to an external unit (for example, the DASH client 114 or the like) via the communication unit 214 of the broadcast distribution server 132, in accordance with this broadcast distribution request. At this time, the broadcast distribution unit 331 performs broadcast distribution by using the broadcast distribution resource 152 (resource for broadcast distribution) secured by the BC/MC resource manager 142.

It is needless to say that the broadcast distribution server 132 can have arbitrary function blocks. For example, it can have function blocks other than the example shown in FIG. 21.

FIG. 22 is a figure which shows a configuration example of the main function blocks of the DASH-MPD server 123. As shown in FIG. 22, the DASH-MPD server 123 has, for example, an MPD generation unit 341, an MPD management unit 342, and an MPD supply unit 343.

The MPD generation unit 341 acquires a url (+range) of DASH segments managed in the DASH segment streamer 122 and metadata of a content managed in the content management server 121, via the communication unit 214 of the DASH-MPD server 123, and generates an MPD based on these information.

The MPD management unit 342 stores the MPD generated by the MPD generation unit 341 in the storage unit 213 of the DASH-MPD server 123, and manages it.

THE MPD supply unit 343 reads the MPD, stored in the storage unit 213 of the DASH-MPD server 123 and managed by the MPD management unit 342, which has been demanded from an external unit (for example, the DASH client 114, the DASH client proxy 143 or the like) via the communication unit 214 of the DASH-MPD server 123, and supplies this read MPD to a demand source via the communication unit 214 of the DASH-MPD server 123.

It is needless to say that the DASH-MPD server 123 can have arbitrary function blocks. For example, it can have function blocks other than the example shown in FIG. 22.

Figure 23:
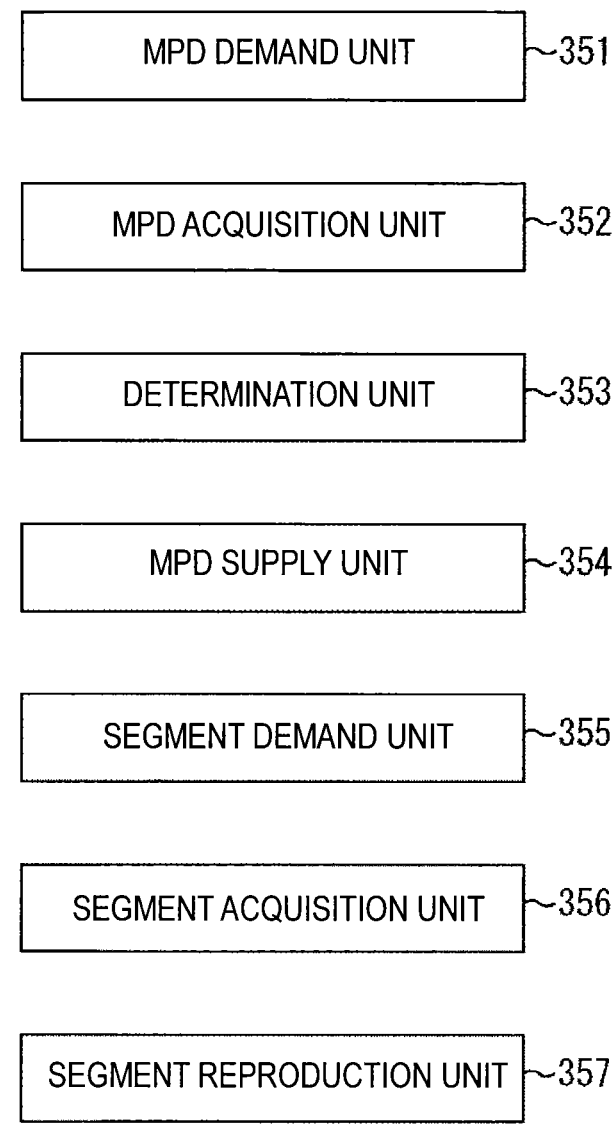
FIG. 23 is a function block diagram which shows an example of the functions of a DASH client.

FIG. 23 is a figure which shows a configuration example of the main function blocks of the DASH client 114. As shown in FIG. 23, the DASH client 114 has, for example, an MPD demand unit 351, an MPD acquisition unit 352, a determination unit 353, an MPD supply unit 354, a segment demand unit 355, a segment acquisition unit 356, and a segment reproduction unit 357.

The MPD demand unit 351 demands the acquisition of an MPD to an external unit (for example, the DASH-MPD server 123 or the like), via the communication unit 214 of the DASH client 114.

The MPD acquisition unit 352 acquires an MPD supplied from an external unit (for example, the DASH-MPD server 123, the BC/MC service provider 124, the DASH client proxy 143 or the like) for the demand made by the MPD demand unit 351, via the communication unit 214 of the DASH client 114.

The determination unit 353 determines a reception method (whether it is preferable to receive unicast distributed data (unicast receive), or whether it is preferable to receive multicast distributed or broadcast distributed data (multicast receive)), based on the MPD supplied from an external unit (for example, the DASH-MPD server 123 or the like) via the communication unit 214 of the DASH client 114, which has been acquired by the MPD acquisition unit 352. That is, the determination unit 353 determines whether or not to supply the MPD to an external unit (for example, the MPD configurator 141 or the like) via the communication unit 214 of the DASH client 114, by confirming the usable band or the like of a resource for each distribution. In the case where it is preferable to unicast receive a content, it may not be necessary to update the MPD, and so the determination unit 353 determines not to supply the MPD. Conversely, in the case where it is desirable to multicast receive a content, it may be necessary to update the MPD, and so the determination unit 353 determines to supply the MPD.

In the case where it is determined to supply the MPD by the determination unit 353, the MPD supply unit 354 supplies the MPD acquired by the MPD acquisition unit 352 to an external unit (for example, the MPD configurator 141 or the like) via the communication unit 214 of the DASH client 114.

In the case of unicast receiving, based on the MPD supplied from an external unit (for example, the BC/MC service provider 124, the DASH client proxy 143 or the like) via the communication unit 214 of the DASH client 114, which has been acquired by the MPD acquisition unit 352, the segment demand unit 355 demands the acquisition of DASH segments to an external unit (for example, the DASH segment streamer 122 or the like), via the communication unit 214 of the DASH client 114.

The segment acquisition unit 356 acquires the DASH segments supplied from an external unit (for example, the DASH segment streamer 122 or the like) for the demand made by the segment demand unit 355, via the communication unit 214 of the DASH client 114. Further, the segment acquisition unit 356 acquires a FLUTE packet or the like supplied from an external unit (for example, the BC/MC service provider 124, the DASH client proxy 143 or the like), via the communication unit 214 of the DASH client 114.

The segment reproduction unit 357 reproduces content data (for example, DASH segments, a FLUTE packet or the like) acquired by the segment acquisition unit 356, and outputs, for example, images or audio from the output unit 212 of the DASH client 114.

It is needless to say that the DASH client 114 can have arbitrary function blocks. For example, it can have function blocks other than the example shown in FIG. 23.

Figure 24:
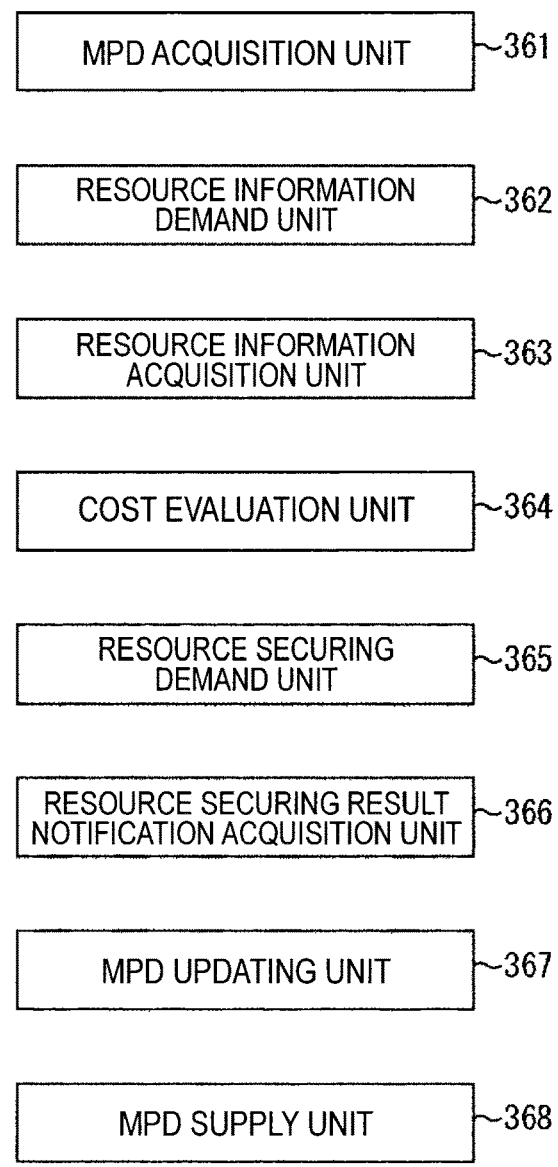
FIG. 24 is a function block diagram which shows an example of the functions of an MPD configurator.

FIG. 24 is a figure which shows a configuration example of the main function blocks of the MPD configurator 141. As shown in FIG. 24, the MPD configurator 141 has, for example, an MPD acquisition unit 361, a resource information demand unit 362, a resource information acquisition unit 363, a cost evaluation unit 364, a resource securing demand unit 365, a resource securing result notification acquisition unit 366, an MPD updating unit 367, and an MPD supply unit 368.

The MPD acquisition unit 361 acquires an MPD supplied from an external unit (for example, the DASH client 114 or the like), via the communication unit 214 of the MPD configurator 141.

In order to confirm a use condition of a resource, the resource information demand unit 362 demands resource information, which is information showing a use condition of the broadcast distribution resource 152 (resource for multicast distribution or broadcast distribution), to an external unit (for example, the BC/MC resource manager 142 or the like), via the communication unit 214 of the MPD configurator 141.

The resource information acquisition unit 363 acquires resource information supplied from an external unit (for example, the BC/MC resource manager 142 or the like) for the demand made by the resource information demand unit 362, via the communication unit 214 of the MPD configurator 141.

The cost evaluation unit 364 evaluates a cost (also called a cost used with BC/MC) of the case where multicast distribution or broadcast distribution is to be used for the distribution of a content, based on the MPD acquired by the MPD acquisition unit 361 and the resource information acquired by the resource information acquisition unit 363. The cost of this case is an arbitrary parameter, which shows an evaluation value for an arbitrary condition, and shows a degree of efficiency of content distribution.

In the case where it is determined to use multicast distribution or broadcast distribution by the cost evaluation unit 364, the resource securing demand unit 365 demands the securing of the usable broadcast distribution resource 152 (resource for multicast distribution or broadcast distribution) to an external unit (for example, the BC/MC resource manager 142 or the like) via the communication unit 214 of the MPD configurator 141, based on the resource information.

The resource securing result notification acquisition unit 366 acquires a notification of a securing result of the broadcast distribution resource 152 (resource for multicast distribution or broadcast distribution), which is supplied from an external unit (for example, the BC/MC resource manager 142 or the like) for the demand made by the resource securing demand unit 365, via the communication unit 214 of the MPD configurator 141.

In the case where it is determined to use multicast distribution or broadcast distribution by the cost evaluation unit 364, the MPD updating unit 367 updates the MPD such as described above in <0. Outline>, so as to use this broadcast distribution resource 152 (resource for multicast distribution or broadcast distribution) for the supply of a content.

The MPD supply unit 368 supplies the MPD updated by the MPD updating unit 367 or the MPD which has not been updated by the MPD updating unit 367 to an external unit (for example, the DASH client proxy 143, the BC/MC service provider 124, the DASH client 114 or the like), via the communication unit 214 of the MPD configurator 141.

It is needless to say that the MPD configurator 141 can have arbitrary function blocks. For example, it can have function blocks other than the example shown in FIG. 24.

Figure 25:
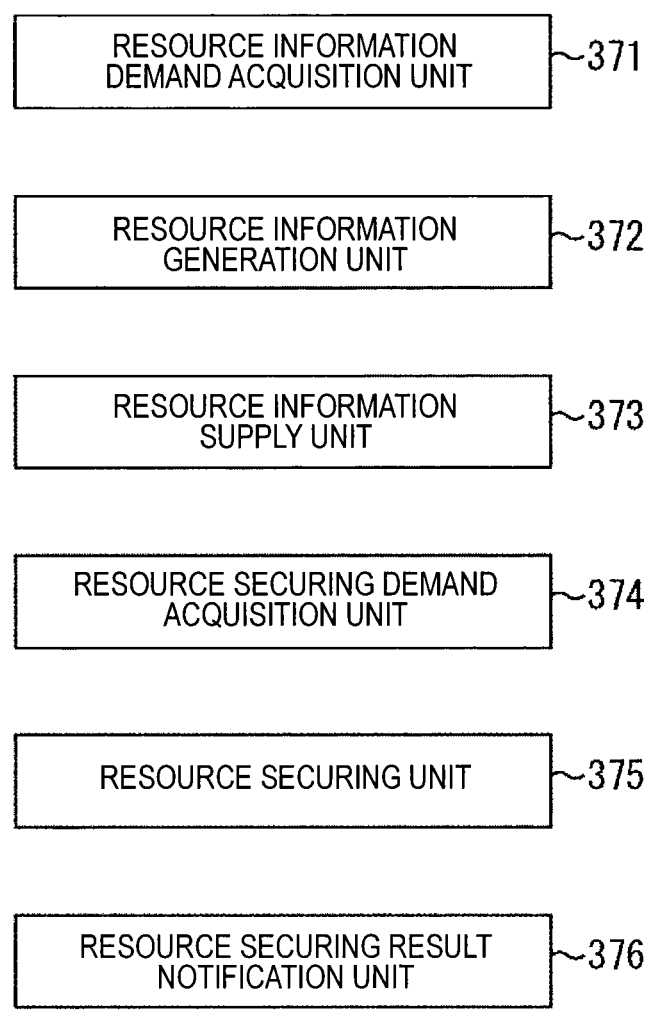
FIG. 25 is a functional block diagram which shows an example of functions of a BC/MC resource manager.

FIG. 25 is a figure which shows a configuration example of the main function blocks of the BC/MC resource manager 142. As shown in FIG. 25, the BC/MC resource manager 142 has, for example, a resource information demand acquisition unit 371, a resource information generation unit 372, a resource information supply unit 373, a resource securing demand acquisition unit 374, a resource securing unit 375, and a resource securing result notification unit 376.

The resource information demand acquisition unit 371 acquires a demand of resource information supplied from an external unit (for example, the MPD configurator 141 or the like), via the communication unit 214 of the BC/MC resource manager 142.

The resource information generation unit 372 investigates a use condition of the broadcast distribution resource 152 (resource for multicast distribution or broadcast distribution) via the communication unit 214 of the BC/MC resource manager 142, in accordance with the demand of resource information acquired by the resource information demand acquisition unit 371, and generates resource information.

The resource information supply unit 373 supplies the resource information generated by the resource information generation unit 372 to an external unit (for example, the MPD configurator 141 or the like) which is a demand source, via the communication unit 214 of the BC/MC resource manager 142.

The resource securing demand acquisition unit 374 acquires a demand of the securing of a broadcast distribution resource supplied from an external unit (for example, the MPD configurator 141 or the like), via the communication unit 214 of the BC/MC resource manager 142.

The resource securing unit 375 secures the demanded broadcast distribution resource 152 (resource for multicast distribution or broadcast distribution), in accordance with the demand of the securing of a broadcast distribution resource acquired by the resource securing demand acquisition unit 374.

The resource securing result notification unit 376 supplies a securing result of the broadcast distribution resource 152 (resource for multicast distribution or broadcast distribution) by the resource securing unit 375 to an external unit (for example, the MPD configurator 141 or the like) which is a demand source, via the communication unit 214 of the BC/MC resource manager 142.

It is needless to say that the BC/MC resource manager 142 can have arbitrary function blocks. For example, it can have function blocks other than the example shown in FIG. 25.

FIG. 26 is a figure which shows a configuration example of the main function blocks of the DASH client proxy 143. As shown in FIG. 26, the DASH client proxy 143 has, for example, an MPD acquisition unit 381, an MPD supply unit 382, a segment demand unit 383, a segment acquisition unit 384, and a FLUTE distribution request unit 385.

The MPD acquisition unit 381 acquires an MPD supplied from an external unit (for example, the MPD configurator 141 or the like), via the communication unit 214 of the DASH client proxy 143.

The MPD supply unit 382 supplies the MPD acquired by the MPD acquisition unit 381 to an external unit (for example, the DASH client 114, the BC/MC service provider 124 or the like), via the communication unit 214 of the DASH client proxy 143.

In the case where multicast distribution or broadcast distribution is to be used for the distribution of a content, based on the MPD acquired by the MPD acquisition unit 381, the segment demand unit 383 demands DASH segments to an external unit (for example, the DASH segment streamer 122 or the like), instead of the DASH client 114, via the communication unit 214 of the DASH client proxy 143.

The segment acquisition unit 384 acquires DASH segments supplied from an external unit (for example, the DASH segment streamer 122 or the like) in accordance with the demand of the segment demand unit 383, via the communication unit 214 of the DASH client proxy 143.

The FLUTE distribution request unit 385 supplies the DASH segments acquired by the segment acquisition unit 384 to an external unit (for example, the BC/MC service provider 124 or the like), via the communication unit 214 of the DASH client proxy 143, and requests these DASH segments so as to perform FLUTE distribution (multicast distribution or broadcast distribution).

It is needless to say that the DASH client proxy 143 can have arbitrary function blocks. For example, it can have function blocks other than the example shown in FIG. 26.

<Flow of the Distribution Control Process>

The MPD configurator 141 (FIG. 24) having the above described functions controls the distribution of a content, so as to be performed more efficiently, by arbitrarily updating an MPD such as described above in <0. Outline>, by executing a distribution control process.

Figure 27:
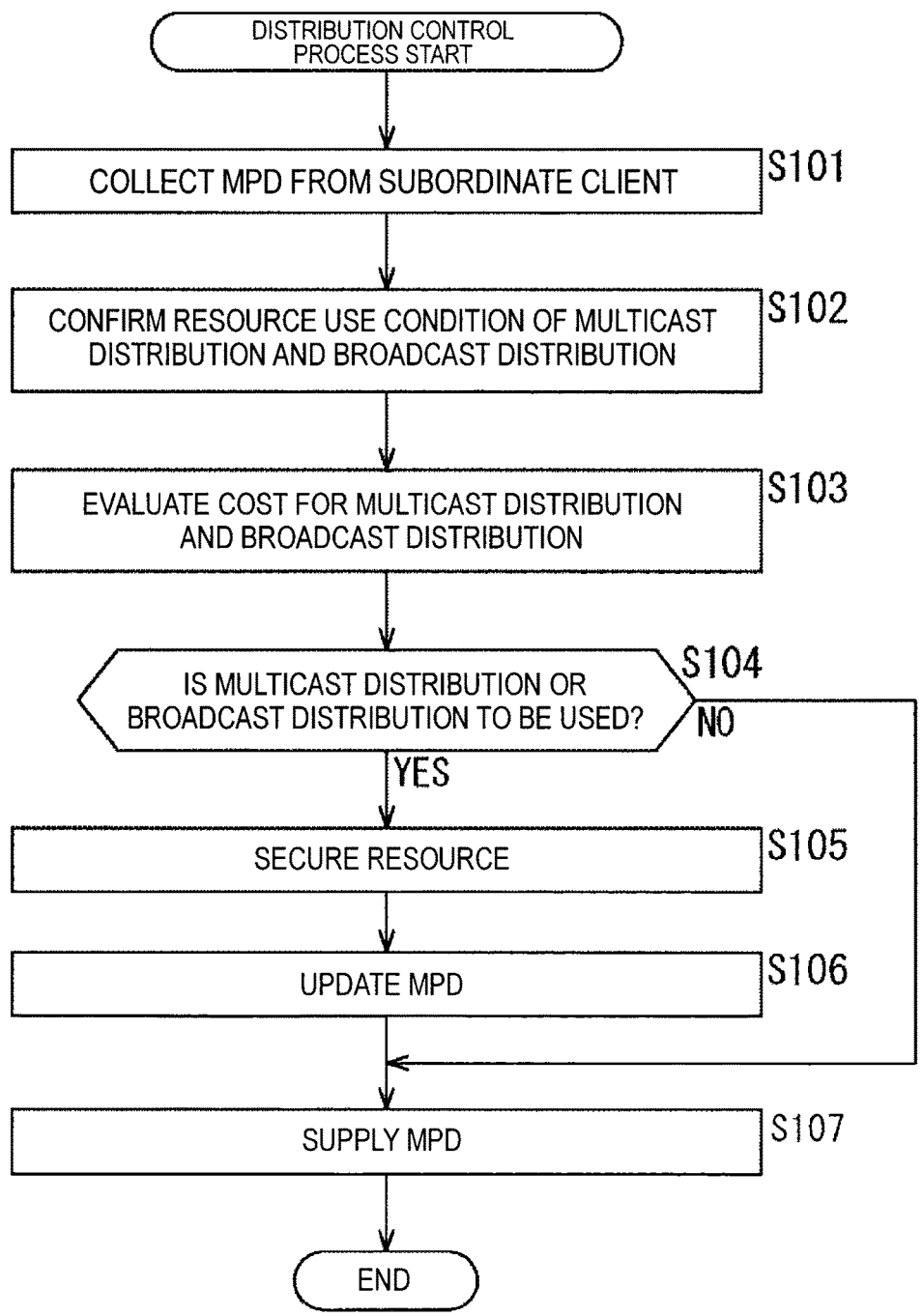
FIG. 27 is a flow chart which describes an example of the flow of a distribution control process.

An example of the flow of this distribution control process by the MPD configurator 141 will be described by referring to the flow chart of FIG. 27.

When the distribution control process is started, in step S101, the MPD acquisition unit 361 of the MPD configurator 141 acquires (collects) an MPD supplied from a (subordinate) client which becomes a management target of the MPD configurator 141.

In step S102, the broadcast distribution resource 152 (resource for multicast distribution and broadcast distribution) is confirmed, by having the resource information demand unit 362 demand resource information, and the resource information acquisition unit 363 acquire resource information.

In step S103, the cost evaluation unit 364 evaluates a cost for multicast distribution and broadcast distribution, in accordance with the collection result of the MPD in step S101 (an acquisition amount of the MPD, that is, a demand amount of a content) and the confirmation result in step S102 (resource information acquired by the resource information acquisition unit 363).

In step S104, the cost evaluation unit 364 determines whether or not to use multicast distribution or broadcast distribution, based on the evaluation result of step S103. In the case where it is determined to be used, the process proceeds to step S105.

In step S105, the usable broadcast distribution resource 152 is secured, by having the resource securing demand unit 365 demand the securing of a resource, and the resource securing result notification acquisition unit 366 acquiring a notification of a resource securing result.

In step S106, the MPD updating unit 367 updates an MPD such as described above in <0. Outline>, so as to use the broadcast distribution resource 152 secured by the process of step S105. When the process of step S106 ends, the process proceeds to step S107.

Further, in step S104, in the case where it is determined that multicast distribution or broadcast distribution is not to be used, the process proceeds to step S107.

In step S107, the MPD supply unit 368 supplies an MPD to the DASH client proxy 143.

When the process of step S107 ends, the distribution control process ends. The MPD configurator 141 can more efficiently perform distribution of a content, by executing such a distribution control process. Further, the MPD configurator 141 repeatedly executes such a distribution control process. In this way, the MPD configurator 141 usually can more efficiently perform distribution of a content. For example, the MPD configurator 141 executes such a distribution control process for a content during distribution. In this way, the MPD configurator 141 can adaptively control the distribution method, and can perform content distribution more efficiently, even during content distribution.

<Flow of the DASH Client Proxy Process>

The DASH client proxy 143 (FIG. 26) having the above described functions executes a DASH client proxy process, in accordance with the distribution control process by the MPD configurator 141, instead of the DASH client 114. In this way, the DASH client proxy 143 executes distribution of a content more efficiently, in accordance with a distribution control of the MPD configurator 141.

Figure 28:
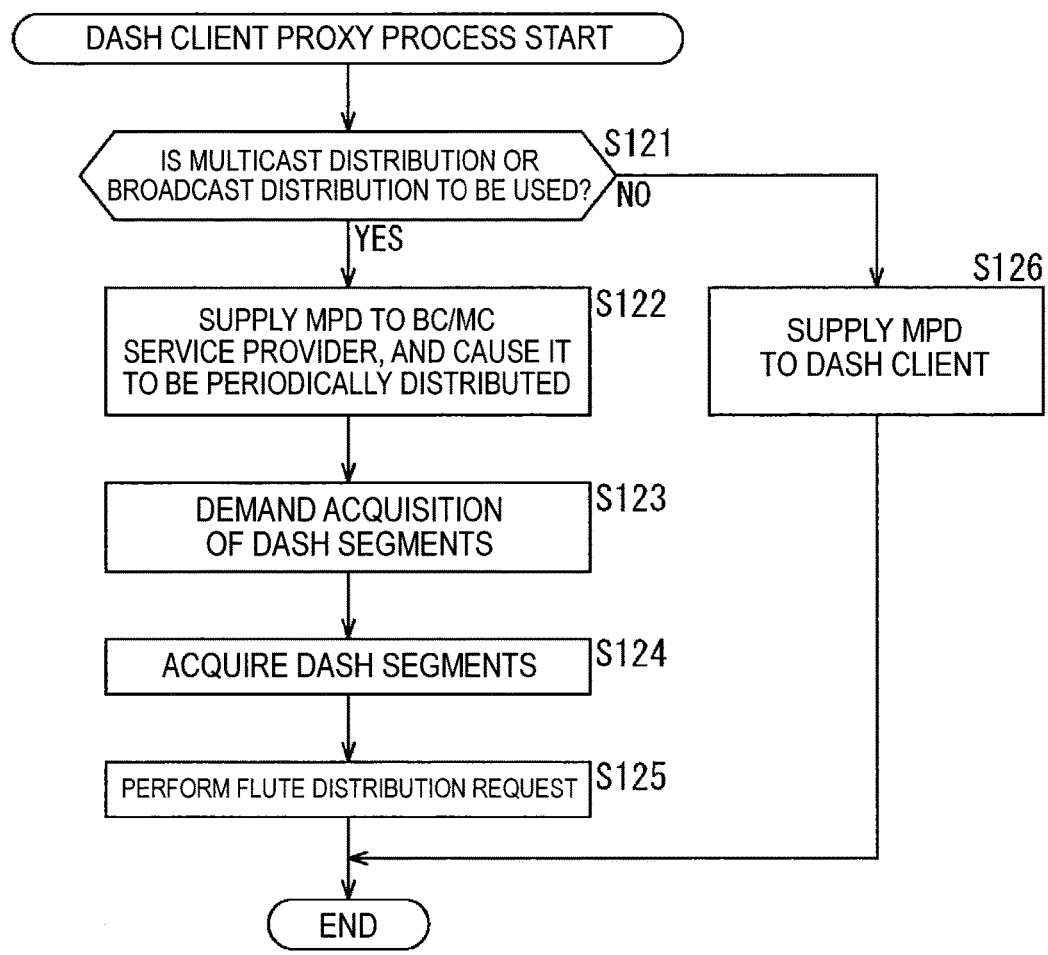
FIG. 28 is a flow chart which describes an example of the flow of a DASH client proxy process.

An example of the flow of this DASH client proxy process by the DASH client proxy 143 will be described by referring to the flow chart of FIG. 28.

When the DASH client proxy process is started, in step S121, the MPD supply unit 382 determines whether or not to use multicast distribution or broadcast distribution, based on an MPD acquired by the MPD acquisition unit 381 (an MPD supplied by the MPD configurator 141). In the case where it is determined to be used, the process proceeds to step S122.

In step S122, the MPD supply unit 382 supplies the MPD acquired by the MPD acquisition unit 381 to the BC/MC service provider 124, and causes this MPD to be periodically distributed to the DASH client 114.

In step S123, the segment demand unit 383 demands the acquisition of DASH segments to the DASH segment streamer 122.

In step S124, the segment acquisition unit 384 acquires DASH segments supplied in accordance with the demand in step S123.

In step S125, the FLUTE distribution request unit 385 supplies the DASH segments acquired in step S124 to the BC/MC service provider 124, and performs a FLUTE distribution request. That is, in this case, a content is multicast distributed or broadcast distributed to the DASH client 114 from the BC/MC service provider 124.

When the process of step S125 ends, the DASH client proxy process ends.

Further, in step S121, in the case where it is determined that multicast distribution or broadcast distribution is not to be used, the process proceeds to step S126.

In step S126, the MPD supply unit 382 supplies the MPD acquired by the MPD acquisition unit 381 to the DASH client 114. In this case, the DASH client 114 demands DASH segments to the DASH segment streamer 122, and acquire them. That is, in this case, a content is unicast distributed.

When the process of step S126 ends, the DASH client proxy process ends.

In this way as described above, the DASH client proxy 143 can execute distribution of a content more efficiently, in accordance with a distribution control of the MPD configurator 141.

Note that, in the case where the distribution control process is repeatedly executed such as described above, this DASH client proxy process is also repeatedly executed corresponding to this. Further, in the case where the distribution control process is executed during content distribution such as described above, this DASH client proxy process is also executed during content distribution corresponding to this.

<Flow of the Content Distribution Process>

An example of the distribution of a content performed by the content distribution system 100 such as described above will be described by referring to the flow charts of FIG. 29 through to FIG. 31.

When the content distribution process is started by the content distribution system 100, the DASH-MPD server 123 generates an MPD by the MPD generation unit 341, for a content managed by the DASH segment streamer 122 (step S211), and manages this MPD by the MPD management unit 342.

The MPD demand unit 351 of the DASH client 114 operated by a user who demands distribution of a content demands the acquisition of an MPD of a desired content to the DASH-MPD server 123 (step S261).

When this demand is received (step S212), the MPD supply unit 343 of the DASH-MPD server 123 supplies the demanded MPD to the DASH client 114 which is a demand source (step S213).

When the MPD acquisition unit 352 of the DASH client 114 receives this MPD (step S262), the determination unit 353 monitors the band, and determines a reception method of a content, that is, whether or not to transmit the MPD, by whether or not unicast reception seems unstable, and whether or not it is a device with which a multicast is capable of being received (step S263).

In the case where unicast reception seems unstable, and a multicast is capable of being received, the determination unit 353 determines to transmit the MPD, and the MPD supply unit 354 supplies the MPD to the MPD configurator 141 (step S264).

When the MPD acquisition unit 361 of the MPD configurator 141 acquires this MPD (step S221), the resource information demand unit 362 demands resource information to the BC/MC resource manager 142 (step S222).

When the resource information demand acquisition unit 371 of the BC/MC resource manager 142 acquires this demand (step S231), the resource information generation unit 372 generates resource information (step S232), and the resource information supply unit 373 supplies this resource information to the MPD configurator 141 which is a demand source (step S233).

When the resource information acquisition unit 363 of the MPD configurator 141 acquires this resource information (step S223), the cost evaluation unit 364 evaluates a cost used with BC/MC, and determines whether or not to use multicast distribution or broadcast distribution (step S224).

Here, it is determined to use multicast distribution or broadcast distribution. In this case, the resource securing demand unit 365 demands the securing of a BC/MC resource (broadcast distribution resource 152) capable of being used based on resource information to the BC/MC resource manager 142 (step S225).

When the resource securing demand acquisition unit 374 of the BC/MC resource manager 142 acquires this demand (step S234), the resource securing unit 375 secures the demanded broadcast distribution resource 152 (step S235), and the resource securing result notification unit 376 notifies a resource securing result to the MPD configurator 141 which is a demand source (step S236).

When the resource securing result notification acquisition unit 366 of the MPD configurator 141 acquires this resource securing result (step S226), the MPD updating unit 367 rewrites an MPD such as described above in <0. Outline> (step S227), and the MPD supply unit 368 supplies the updated MPD to the DASH client proxy 143 (step S228).

When the MPD acquisition unit 381 of the DASH client proxy 143 acquires this MPD (step S241), in the case where multicast distribution or broadcast distribution is not to be used, the MPD supply unit 382 supplies this MPD to the DASH client 114, and in the case where multicast distribution or broadcast distribution is to be used, supplies it to the BC/MC service provider 124 (step S242).

When this MPD is acquired (step S251), the MPD multicast distribution unit 312 of the BC/MC service provider 124 (FLUTE server 131) periodically (that is, repeats a plurality of times) multicast distributes the acquired MPD to the DASH client 114 (step S252).

The MPD acquisition unit 352 of the DASH client 114 acquires the MPD supplied from the DASH client proxy 143, or the MPD periodically multicast distributed from the BC/MC service provider 124 (step S266).

Figure 30:
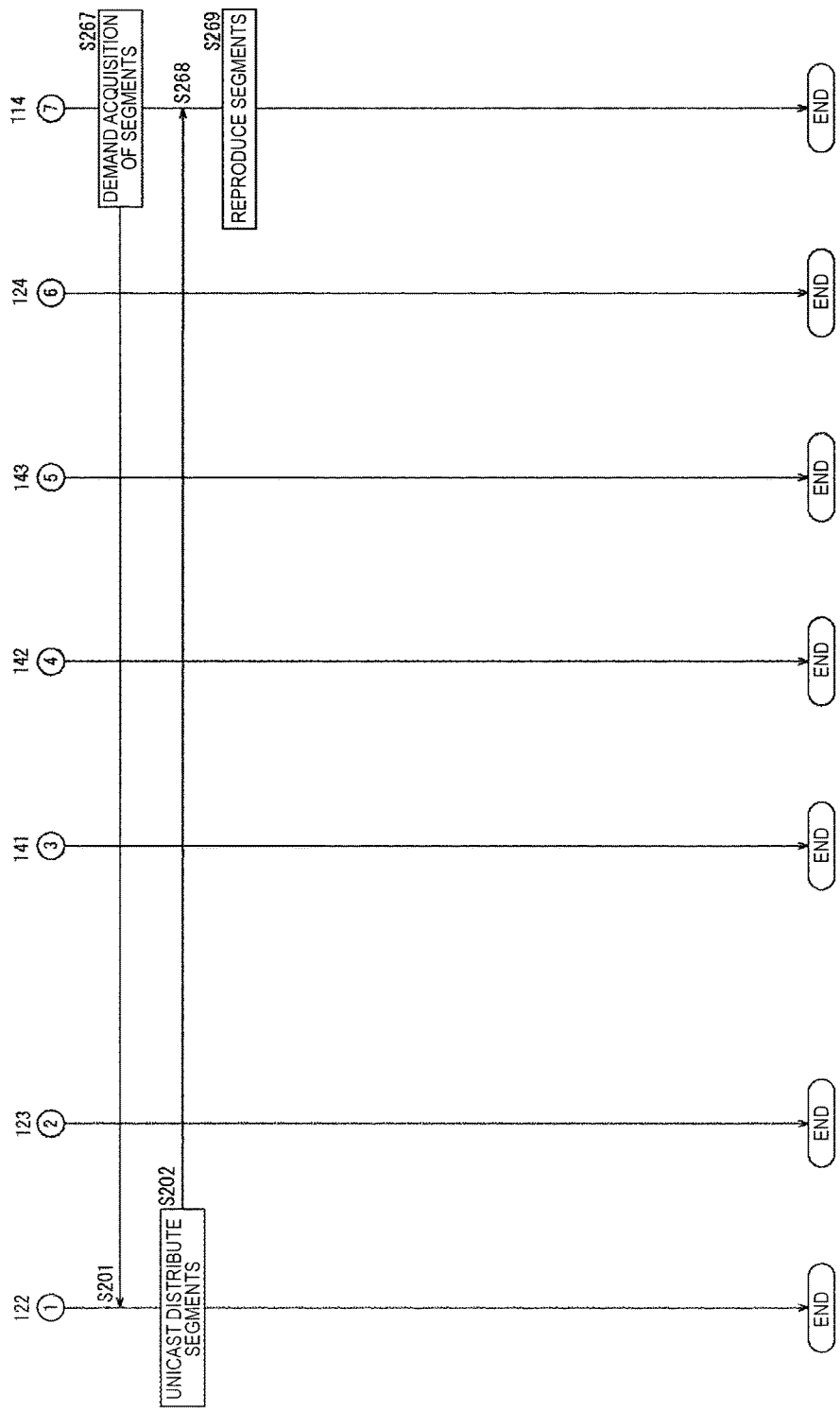
FIG. 30 is a flow chart, continuing from FIG. 29, which describes an example of the flow of a content distribution process.

Here, in the MPD acquired by the MPD acquisition unit 352, in the case where multicast distribution or broadcast distribution is not to be used, that is, in the case where DASH segments are acquired by unicast distribution, the process proceeds to FIG. 30.

In this case, the segment demand unit 355 of the DASH client 114 demands the acquisition of desired DASH segments to the DASH segment streamer 122, based on information of the MPD (step S267).

When this demand is acquired (step S201), the DASH segment supply unit 303 of the DASH segment streamer 122 supplies (unicast distributes) the demanded DASH segments to the DASH client 114 which is a demand source (step S202).

When the segment acquisition unit 356 of the DASH client 114 acquires these unicast distributed DASH segments (step S268), the segment reproduction unit 357 reproduces these DASH segments (step S269).

Figure 29:
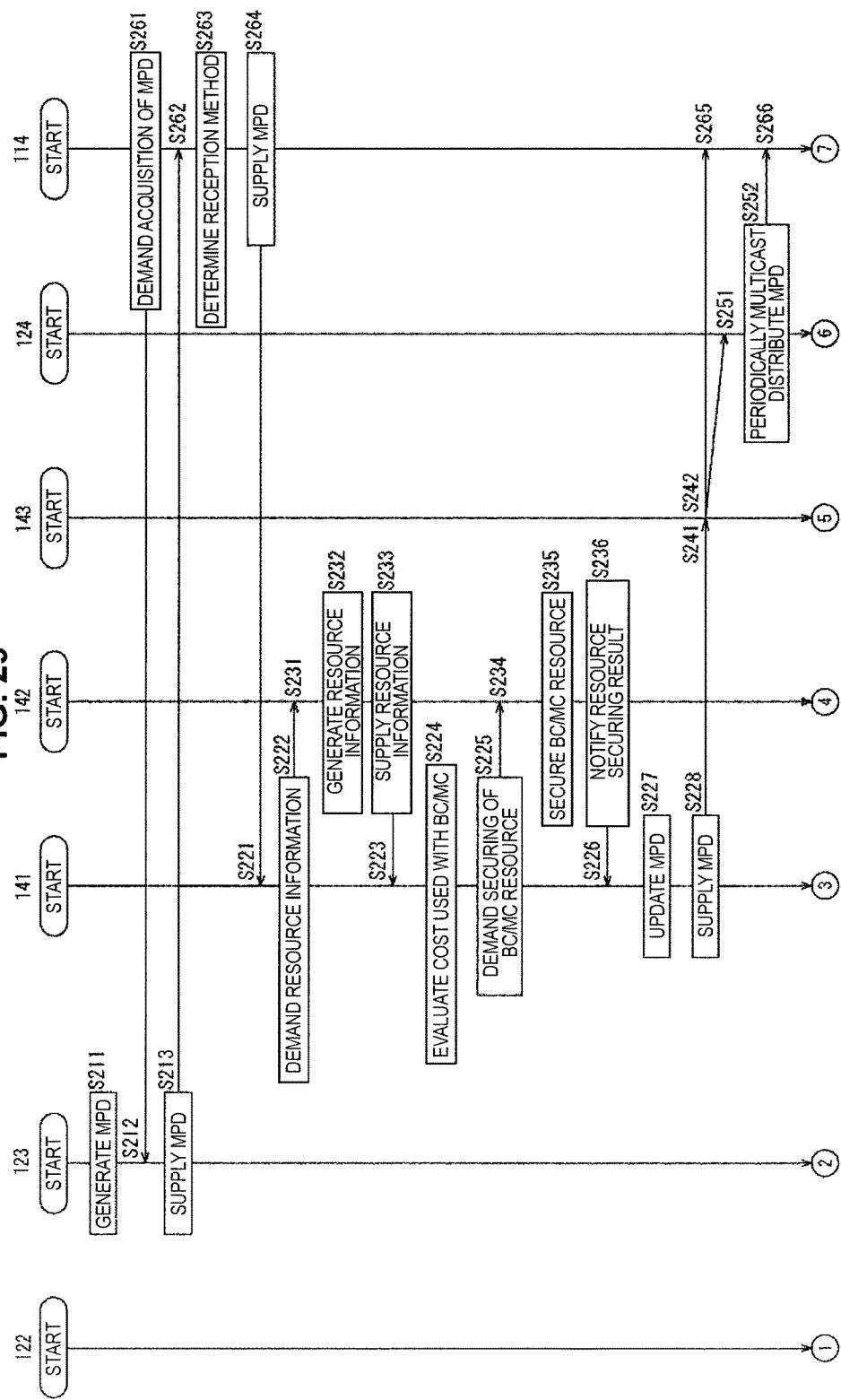
FIG. 29 is a flow chart which describes an example of the flow of a content distribution process.
Figure 31:
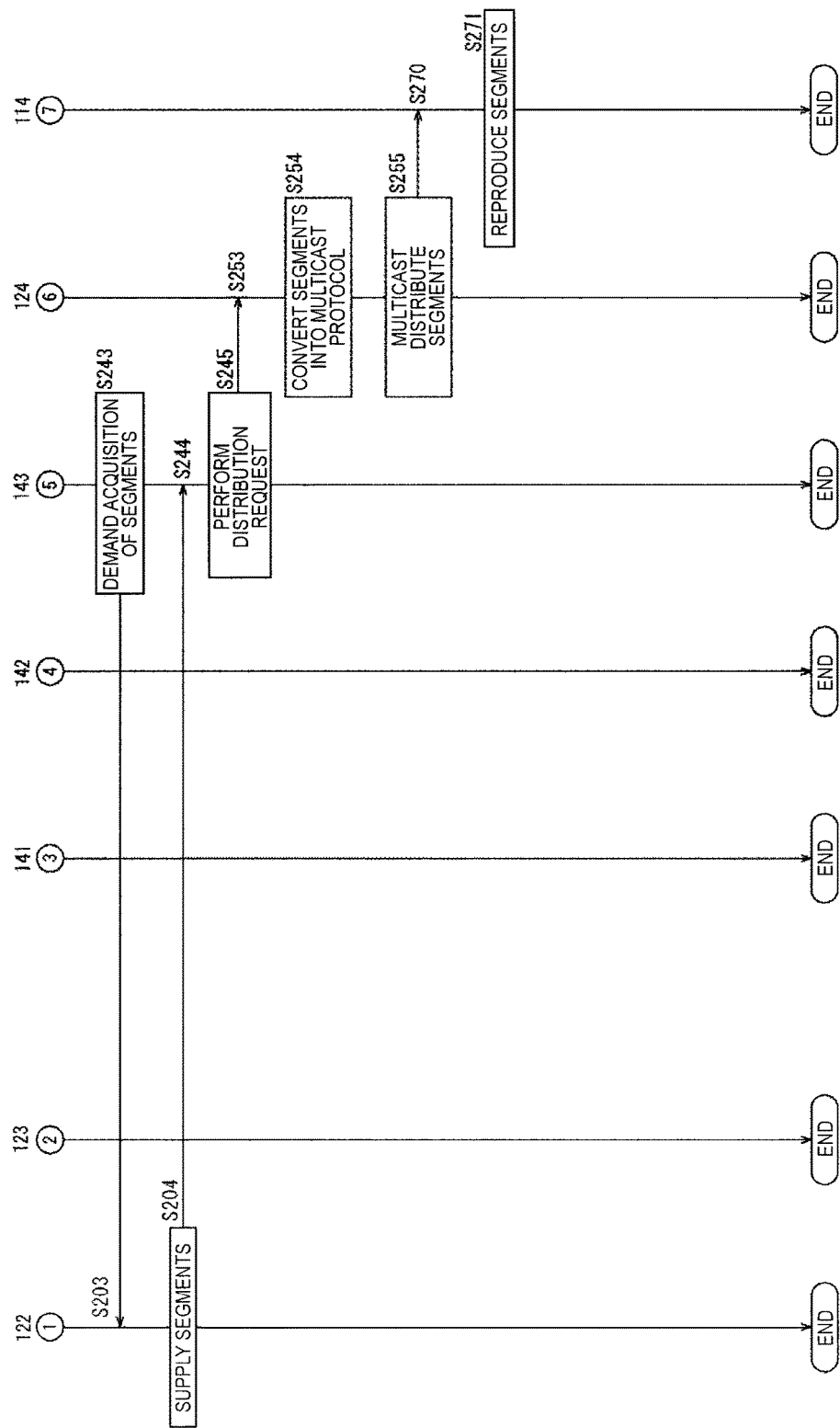
FIG. 31 is a flow chart, continuing from FIG. 29, which describes an example of the flow of a content distribution process.

Further, in the MPD acquired by the MPD acquisition unit 352 in step S266 of FIG. 29, in the case where it is considered that multicast distribution or broadcast distribution is to be used, that is, in the case where the DASH segments are acquired by multicast distribution or broadcast distribution, the process proceeds to FIG. 31.

In this case, the segment demand unit 383 of the DASH client proxy 143 demands the acquisition of desired DASH segments to the DASH segment streamer 122, based on information of the MPD, instead of the DASH client 114 (step S243).

When this demand is acquired (step S203), the DASH segment supply unit 303 of the DASH segment streamer 122 supplies the demanded DASH segments to the DASH client proxy 143 which is a demand source (step S204).

When the segment acquisition unit 384 of the DASH client proxy 143 acquires these DASH segments (step S244), the FLUTE distribution request unit 385 supplies these DASH segments to the BC/MC service provider 124, and performs a distribution request (step S245).

When these DASH segments are acquired (step S253), the protocol conversion unit 311 of the BC/MC service provider 124 (FLUTE server 131) converts the acquired DASH segments into a multicast protocol (for example, a FLUTE protocol or the like) (step S254).

In the case of performing multicast distribution, the segment multicast distribution unit 313 multicast distributes these protocol converted DASH segments (FDT and FLUTE packet) to the DASH client 114 (step S255).

Note that, here, in the case of performing broadcast distribution, the broadcast distribution request unit 314 supplies the protocol converted DASH segments (FDT and FLUTE packet) to the broadcast distribution server 132, and performs a broadcast distribution request. By receiving this, the broadcast distribution unit 331 of the broadcast distribution server 132 broadcast distributes the protocol converted DASH segments (FDT and FLUTE packet) to the DASH client 114.

The segment acquisition unit 356 of the DASH client 114 acquires such multicast distributed (or broadcast distributed) segments (FDT and FLUTE packet) (step S270), and the segment reproduction unit 357 reproduces these segments (FDT and FLUTE packet) (step S271).

By performing a content distribution process such as described above, the content distribution system 100 can perform content distribution more efficiently.

2. Second Embodiment

<Content Distribution System>

Note that, in the first embodiment, while the MPD configurator 141 has been described such as collecting an MPD supplied from the DASH client 114, the sending source of an MPD may be anywhere, and is not limited to this. For example, it may be supplied from a device of the content provision system 111 side such as the DASH-MPD server 123. Further, for example, a proxy server which performs processes instead of the DASH-MPD server 123 may be included, and an MPD may be supplied from this proxy server.

Figure 32:
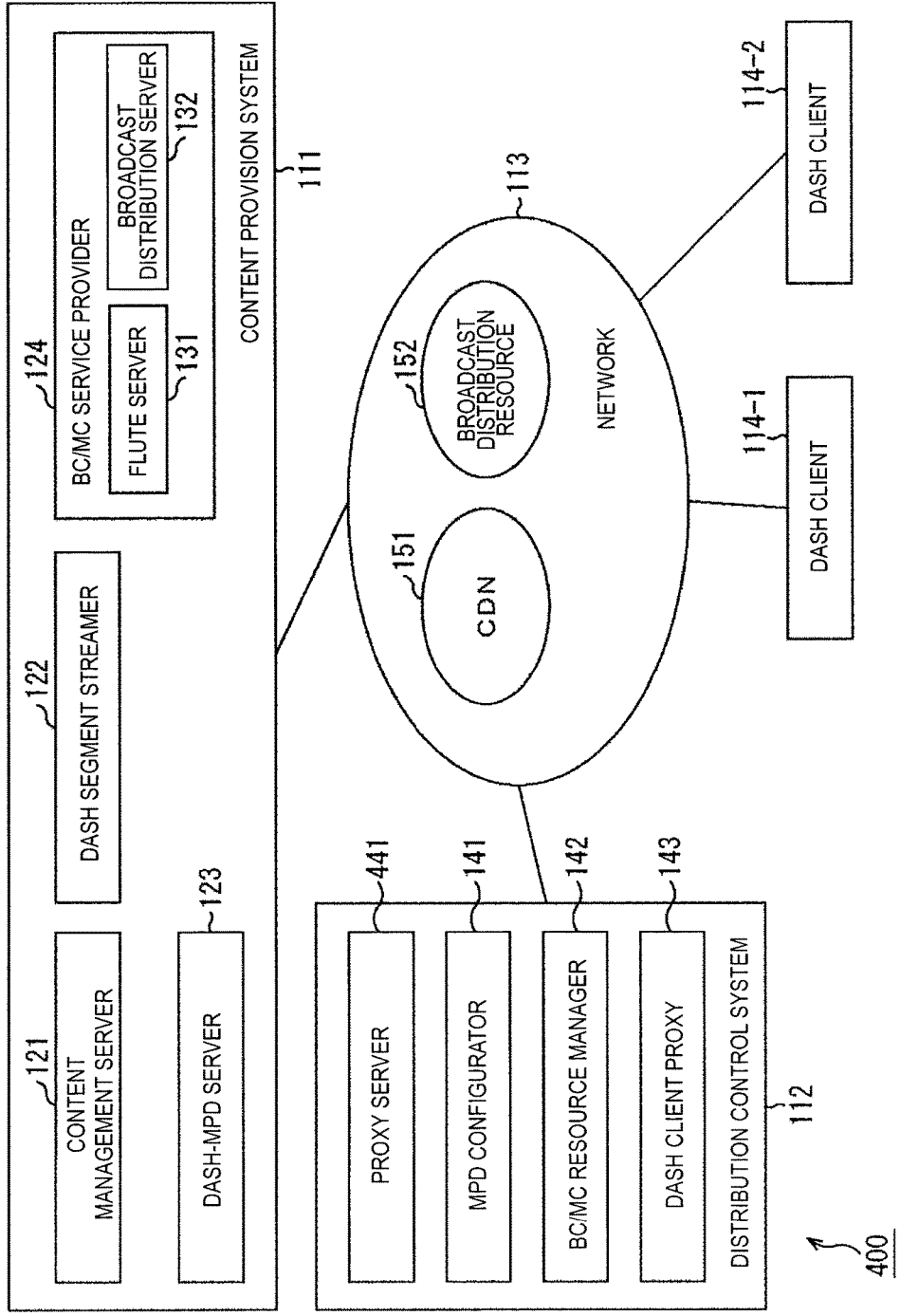
FIG. 32 is a block diagram which shows another configuration example of the content distribution system.

FIG. 32 is a block diagram which shows a main configuration example of a content distribution system which is an embodiment of a content supply system applicable to the present disclosure.

The content distribution system 400 shown in FIG. 32 is a system the same as the content distribution system 100 (FIG. 17). The content distribution system 400 has, in addition to the configuration of the content distribution system 100, a proxy server 441 as the configuration of the distribution control system 112.

The proxy server 441 is a server which behaves as the DASH-MPD server 123 or the DASH segment streamer 122 for the DASH client 114, by developing (caching) a file on FLUTE distributed by a multicast or broadcast on a network.

<Physical Configuration>

This proxy server 441 also has a configuration the same as the MPD configurator 141. That is, hereinafter, the case which describes the physical configuration of a device of the proxy server 441 will be described by referring to FIG. 18.

<Functional Configuration>

Figure 33:
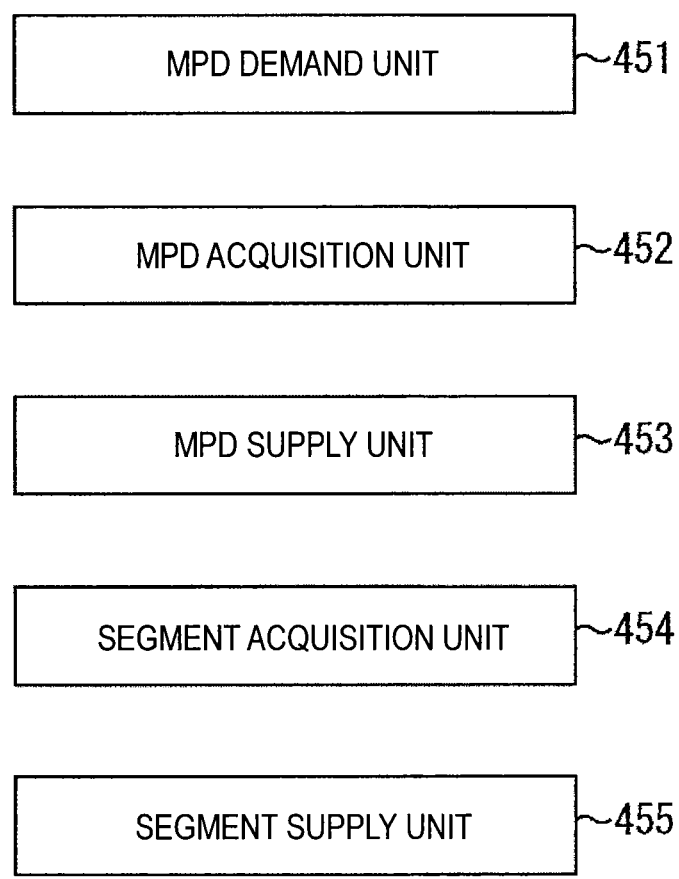
FIG. 33 is a function block diagram which shows an example of the functions of a proxy server.

FIG. 33 is a figure which shows a configuration example of the main function blocks of the proxy server 441. As shown in FIG. 33, the proxy server 441 has, for example, an MPD demand unit 451, an MPD acquisition unit 452, an MPD supply unit 453, a segment acquisition unit 454, and a segment supply unit 455.

The MPD demand unit 451 acquires an MPD acquisition demand from an external unit (for example, the DASH client 114 or the like), via the communication unit 214 of the proxy server 441, and demands the acquisition of an MPD to an external unit (for example, the DASH-MPD server 123 or the like), based on this demand.

The MPD acquisition unit 452 acquires an MPD supplied from an external unit (for example, the DASH-MPD server 123, the FLUTE server 131, the broadcast distribution (MBMS) server 132, the MPD configurator 141 or the like) for the demand made by the MPD demand unit 451, via the communication unit 214 of the proxy server 441.

The MPD supply unit 453 supplies the MPD acquired by the MPD acquisition unit 452 to an external unit (for example, the MPD configurator 141, the DASH client 114 or the like), via the communication unit 214 of the proxy server 441.

The segment acquisition unit 454 acquires segments (FDT and FLUTE packet) supplied from an external unit (for example, the FLUTE server 131, the broadcast distribution (MBMS) server 132 or the like), via the communication unit 214 of the proxy server 441.

The segment supply unit 455 supplies the segments (FDT and FLUTE packet) acquired by the segment acquisition unit 454 to an external unit (for example, the DASH client 114 or the like), via the communication unit 214 of the proxy server 441.

It is needless to say that the proxy server 441 can have arbitrary function blocks. For example, it can have function blocks other than the example shown in FIG. 33.

<Flow of the Content Distribution Process>

An example of such a distribution of a content performed by the content distribution system 400 (FIG. 32) will be described by referring to the flow charts of FIG. 34 through to FIG. 36.

In the case of the content distribution process by the content distribution system 400, the DASH-MPD server 123 generates an MPD by the MPD generation unit 341 (step S411), and manages this MPD by the MPD management unit 342, for a content managed by the DASH segment streamer 122.

However, an MPD demand from the DASH client 114 (step S471) is supplied to the DASH-MPD server 123 via the proxy server 441. That is, the MPD demand unit 451 of the proxy server 441 acquires an MPD demand from the DASH client 114 (step S421), and supplies this to the DASH-MPD server 123 (step S422).

Therefore, in this case, when the demand supplied via the proxy server 441 is received (step S412), the MPD supply unit 343 of the DASH-MPD server 123 supplies the demanded MPD to the proxy server 441 (step S413).

When this MPD is acquired (step S423), the MPD acquisition unit 452 of the proxy server 441 supplies this to the MPD configurator 141 (step S424).

That is, in this case, the MPD is supplied from the proxy server 441 to the MPD configurator 141. That is, in this case, a control of a distribution method of a content is performed by the MPD configurator 141, even if the DASH client 114 does not supply the MPD to the MPD configurator 141.

The MPD configurator 141 performs each of the processes of step S431 through to step S437 the same as each of the processes of step S221 through to step S227 (FIG. 29), the BC/MC resource manager 142 performs each of the processes of step S441 through to step S446 the same as each of the processes of step S231 through to step S236, a distribution method is determined, and the MPD is updated as necessary.

In this case, the MPD supply unit 368 of the MPD configurator 141 supplies the MPD to the proxy server 441 (step S438).

When the MPD acquisition unit 452 of the proxy server 441 acquires this MPD (step S425), the MPD supply unit 453 supplies this MPD to the DASH client proxy 143 (step S426).

The process from here onwards are the same as the case of the first embodiment.

That is, the DASH client proxy 143 performs each of the processes of step S451 and step S452 the same as each of the processes of step S241 and step S242 (FIG. 29), the BC/MC service provider 124 performs each of the processes of step S461 and step S462 the same as each of the processes of step S251 and step S252 (FIG. 29), and the DASH client 114 performs each of the processes of step S472 through to step S473 the same as each of the processes of step S263, step S265 and step S266 (FIG. 29). However, in this case, since an MPD is acquired in step S472 or step S473, the DASH client 114 performs a determination of a reception method in step S474.

Figure 34:
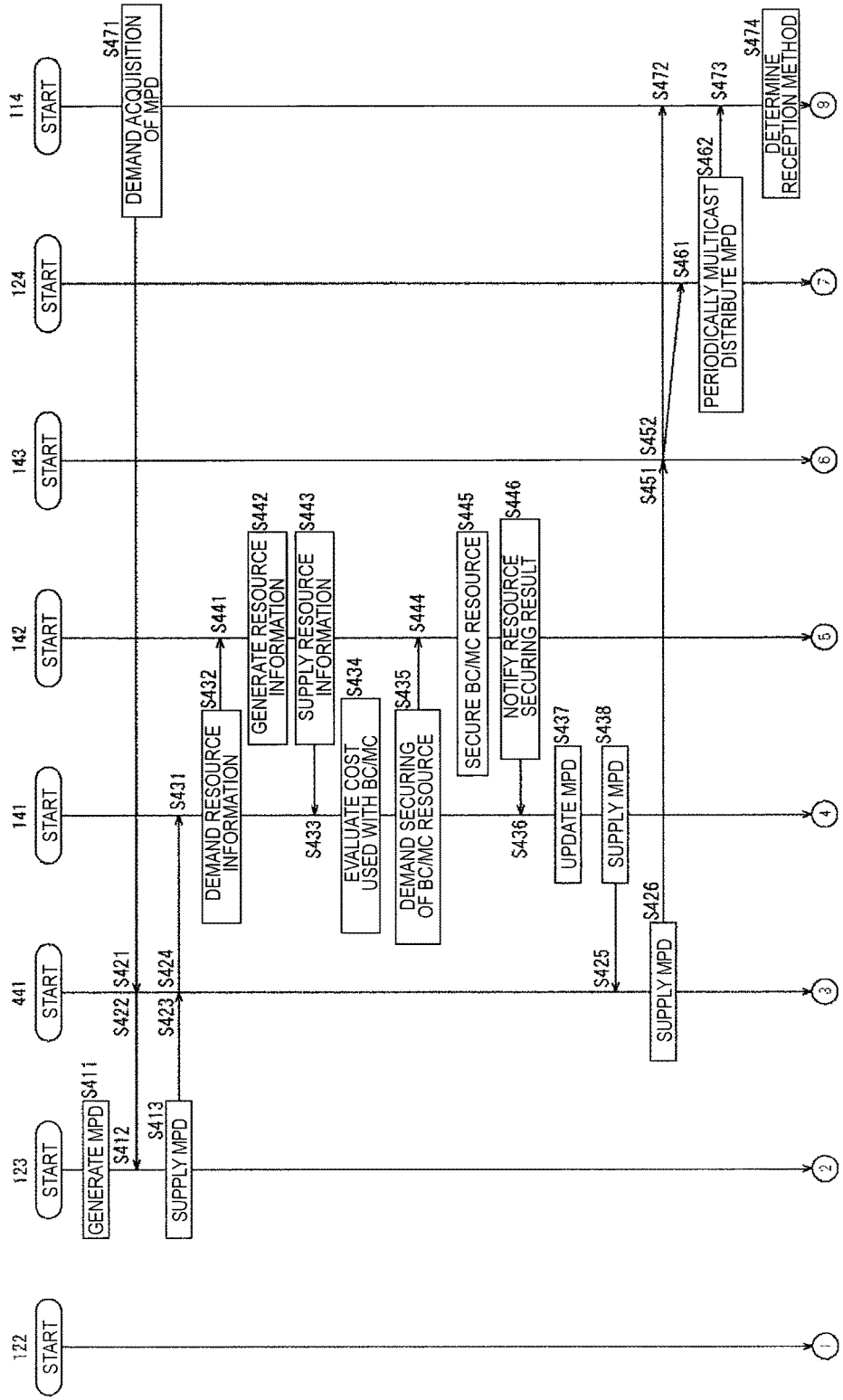
FIG. 34 is a flow chart which describes another example of the flow of a content distribution process.
Figure 35:
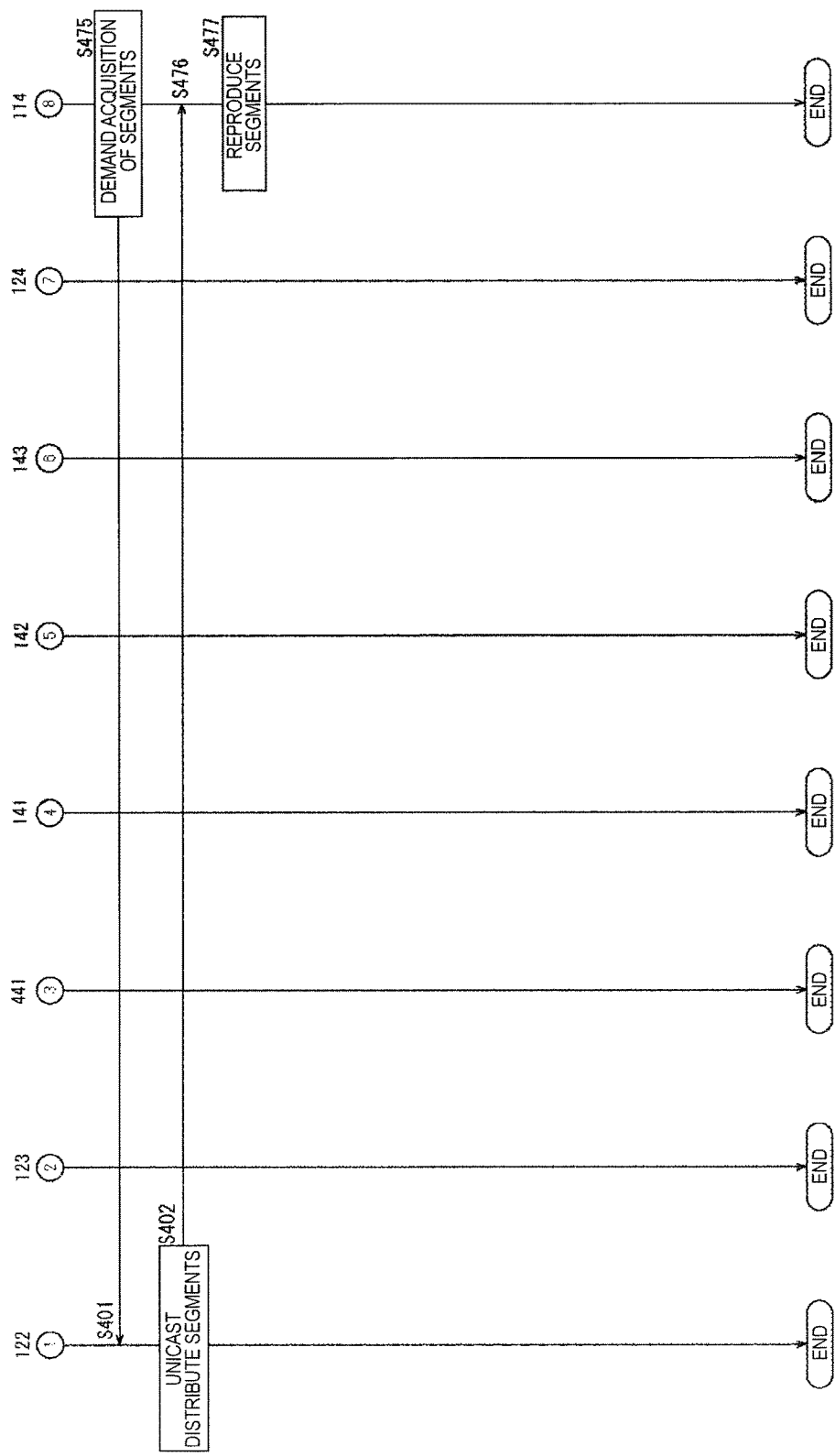
FIG. 35 is a flow chart, continuing from FIG. 34, which describes another example of the flow of a content distribution process.

In the case where unicast reception is selected in FIG. 34, the process proceeds to FIG. 35. That is, the DASH segment streamer 122 performs each of the processes of step S401 and step S402 the same as each of the processes of step S201 and step S202 (FIG. 30). Further, the DASH client 114 performs each of the processes of step S475 through to step S477 the same as each of the processes of step S267 through to step S269 (FIG. 30).

Figure 36:
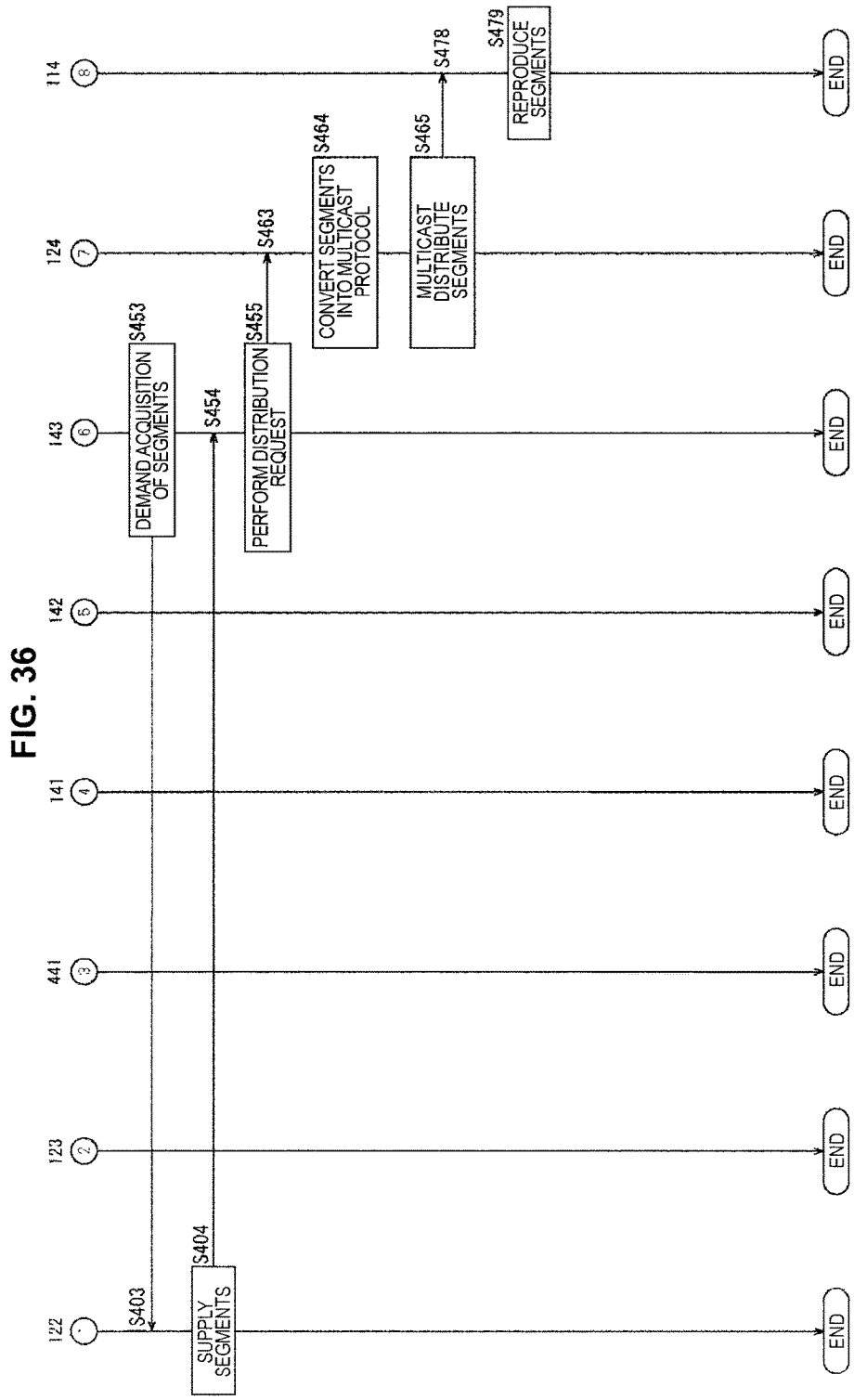
FIG. 36 is a flow chart, continuing from FIG. 34, which describes another example of the flow of a content distribution process.

In the case where multicast reception (or broadcast reception) is selected in FIG. 34, the process proceeds to FIG. 36. That is, the DASH segment streamer 122 performs each of the processes of step S403 and step S404 the same as each of the processes of step S203 and step S204 (FIG. 31).

Further, the DASH client proxy 143 performs each of the processes of step S453 through to step S455 the same as each of the processes of step S243 through to step S245 (FIG. 31).

In addition, the BC/MC service provider 124 performs each of the processes of step S463 through to step S465 the same as each of the processes of step S253 through to step S255 (FIG. 31).

Further, the DASH client 114 performs each of the processes of step S478 and step S479 the same as each of the processes of step S270 and step S271 (FIG. 31).

By performing a content distribution process such as described above, the content distribution system 400 can also perform content distribution more efficiently.

3. Third Embodiment

<Transmission of an MPD and Stream>

In the present embodiment, an example of the flow of the transmission of an MPD and stream described in first embodiment or the second embodiment will be additionally described.

Figure 37:
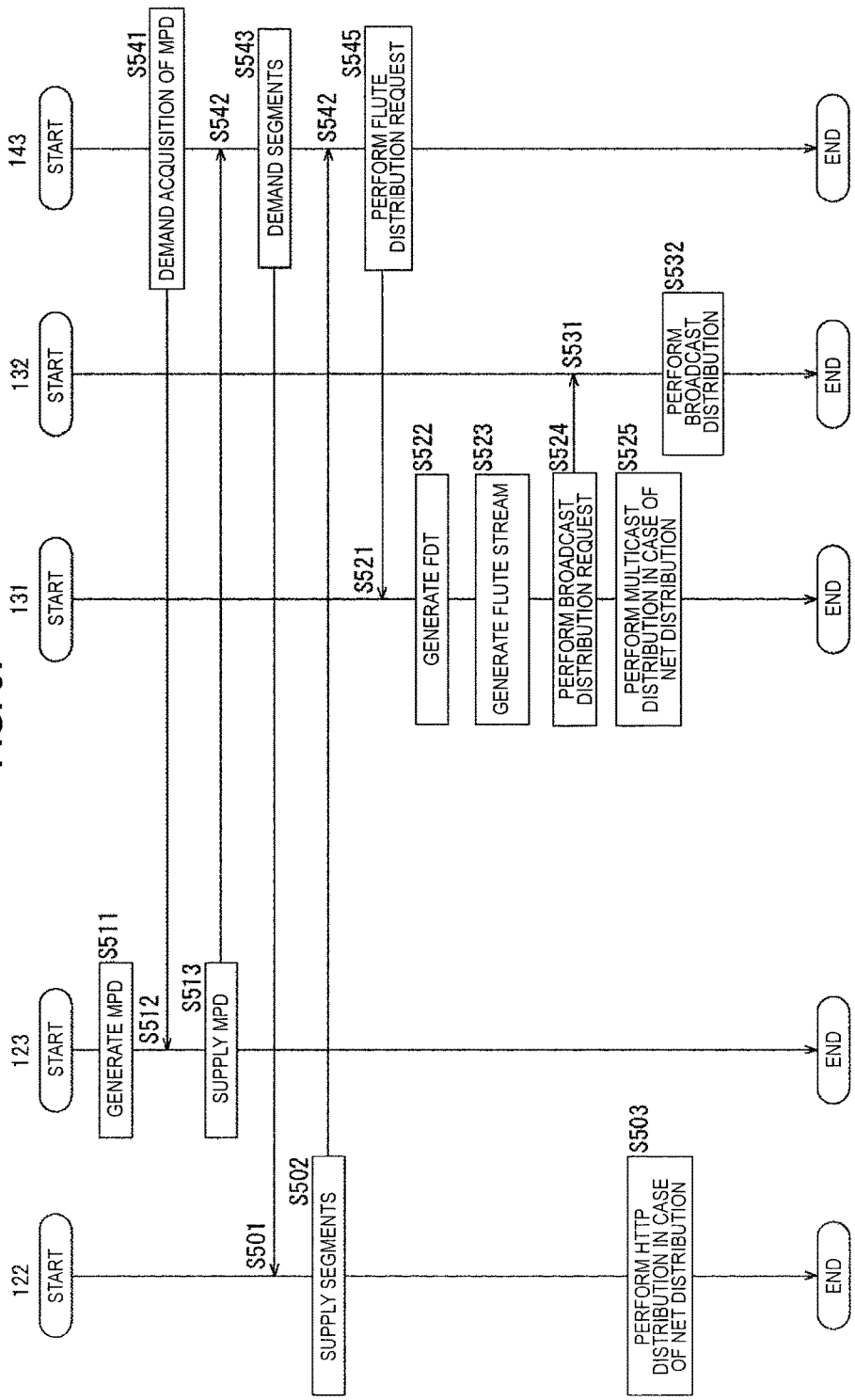
FIG. 37 is a flow chart which describes an example of the flow of a distribution process of an MPD and segments.

An example of the flow of processes from a content managed in the content management server 121 until DASH stream segment generation in the DASH segment streamer 122, or DASH-MPD generation by the DASH-MPD server 123, and the flow of processes from stream segments and a stream segment url generated in the DASH segment streamer 122 until the generation of an FDT of FLUTE and a FLUTE stream in the FLUTE server 131, will be described by referring to the flow chart of FIG. 37.

The DASH-MPD server 123 performs each of the processes of step S511 through to step S513 the same as each of the processes of step S211 through to step S213 (FIG. 29). Further, in the case of this example, the MPD acquisition unit 381 of the DASH client proxy 143 performs each of the processes of step S541 and step S542 the same as each of the processes of step S261 and step S262 (FIG. 29), instead of the DASH client 114.

When an MPD is acquired, the DASH segment streamer 122 performs each of the processes of step S501 and step S502 the same as each of the processes of step S203 and step S204 (FIG. 31). In contrast to this, the segment demand unit 383 of the DASH client proxy 143 performs each of the processes of step S543 and step S544 the same as step S243 and step S244 (FIG. 31).

In the case where unicast distribution is to be used, in step S503, the DASH segment streamer 122 HTTP distributes DASH segments.

Further, in the case where multicast distribution or broadcast distribution is to be used, the FLUTE distribution request unit 385 of the DASH client proxy 143 performs the process of step S545 the same as the process of step S245 (FIG. 31). That is, the DASH client proxy 143 performs a FLUTE distribution request demand to the FLUTE server 131 of the BC/MC service provider 124.

When the protocol conversion unit 311 of the FLUTE server 131 acquires this FLUTE distribution request demand (step S521), the FDT generation unit 321 generates an FDT (step S522), and the FLUTE stream generation unit 322 generates a FLUTE stream (FLUTE packet or the like) (step S523).

In the case of performing broadcast distribution, the broadcast distribution request unit 314 supplies this FDT, FLUTE packet or the like to the broadcast distribution (MBMS) server 132, and performs a broadcast distribution request (step S524). When this request is received (step S532), the broadcast distribution unit 331 of the broadcast distribution (MBMS) server 132 broadcast distributes the FDT and FLUTE packet, based on this request (step S532).

In the case of performing multicast distribution, the segment multicast distribution unit 313 of the FLUTE server 131 multicast distributes the FDT, FLUTE packet or the like (step S525).

Next, in the case of unicast distribution, the flow of the processes of stream segment acquisition and reproduction of MPD distribution and client initiation will be described by referring to the flow chart of FIG. 38.

In this case, the DASH client 114 performs each of the processes of step S571 through to step S575 the same as each of the processes of step S261 and step S262 (FIG. 29), and step S267 through to step S269 (FIG. 30).

Further, the DASH-MPD server 123 performs each of the processes of step S561 and step S562 the same as each of the processes of step S212 and step S213 (FIG. 29).

Also, the DASH segment streamer 122 performs each of the processes of step S551 and step S552 the same as each of the processes of step S201 and step 202 (FIG. 30).

Next, in the case of multicast distribution or broadcast distribution, the flow of the processes of stream segment reception and reproduction of MPD distribution and client reception will be described by referring to the flow chart of FIG. 39.

Figure 38:
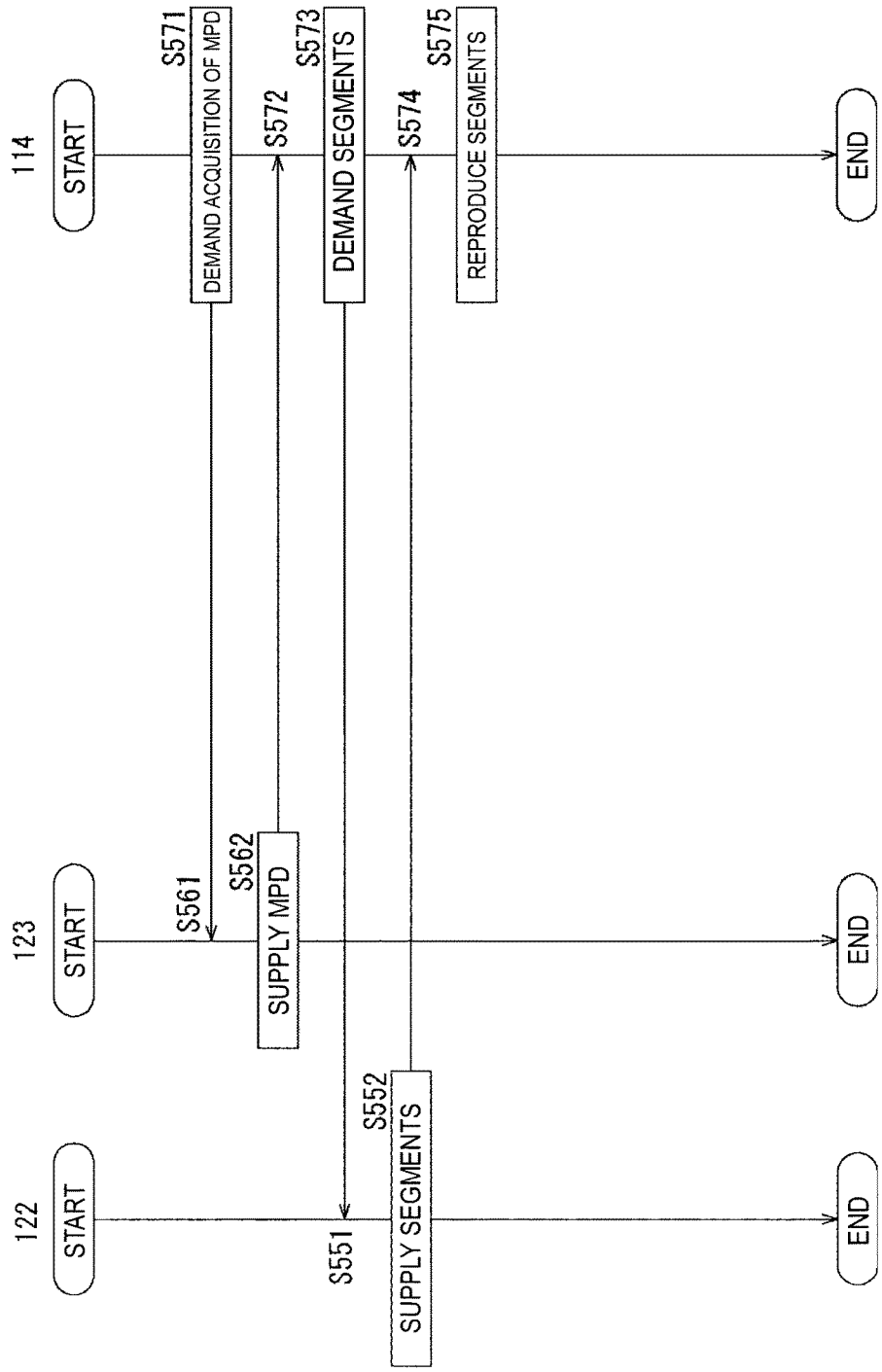
FIG. 38 is a flow chart which describes an example of the flow of a distribution process of an MPD and segments, in the case of unicast distribution.

In this case, the DASH client 114 performs each of the processes of step S611 and step S612 the same as each of the processes of step S571 and step S572 (FIG. 38). In contrast to this, the DASH-MPD server 123 performs each of the processes of step S581 and step S582 the same as each of the processes of step S561 and step S562 (FIG. 38).

In the case of multicast distribution, the FLUTE server 131 multicast distributes segments (step S591). In the case of broadcast distribution, it becomes a broadcast distribution request to the broadcast distribution (MBMS) server 132. In this case, the broadcast distribution (MBMS) server 132 acquires this request (segments) (step S601), and performs broadcast distribution (step S602).

In the case of multicast distribution, the DASH client 114 acquires segments supplied from the FLUTE server 131 (step S613), and in the case of broadcast distribution, acquires segments supplied from the broadcast distribution (MBMS) server 132 (step S614).

The DASH client 114 reproduces such acquired segments (step S615).

Figure 40:
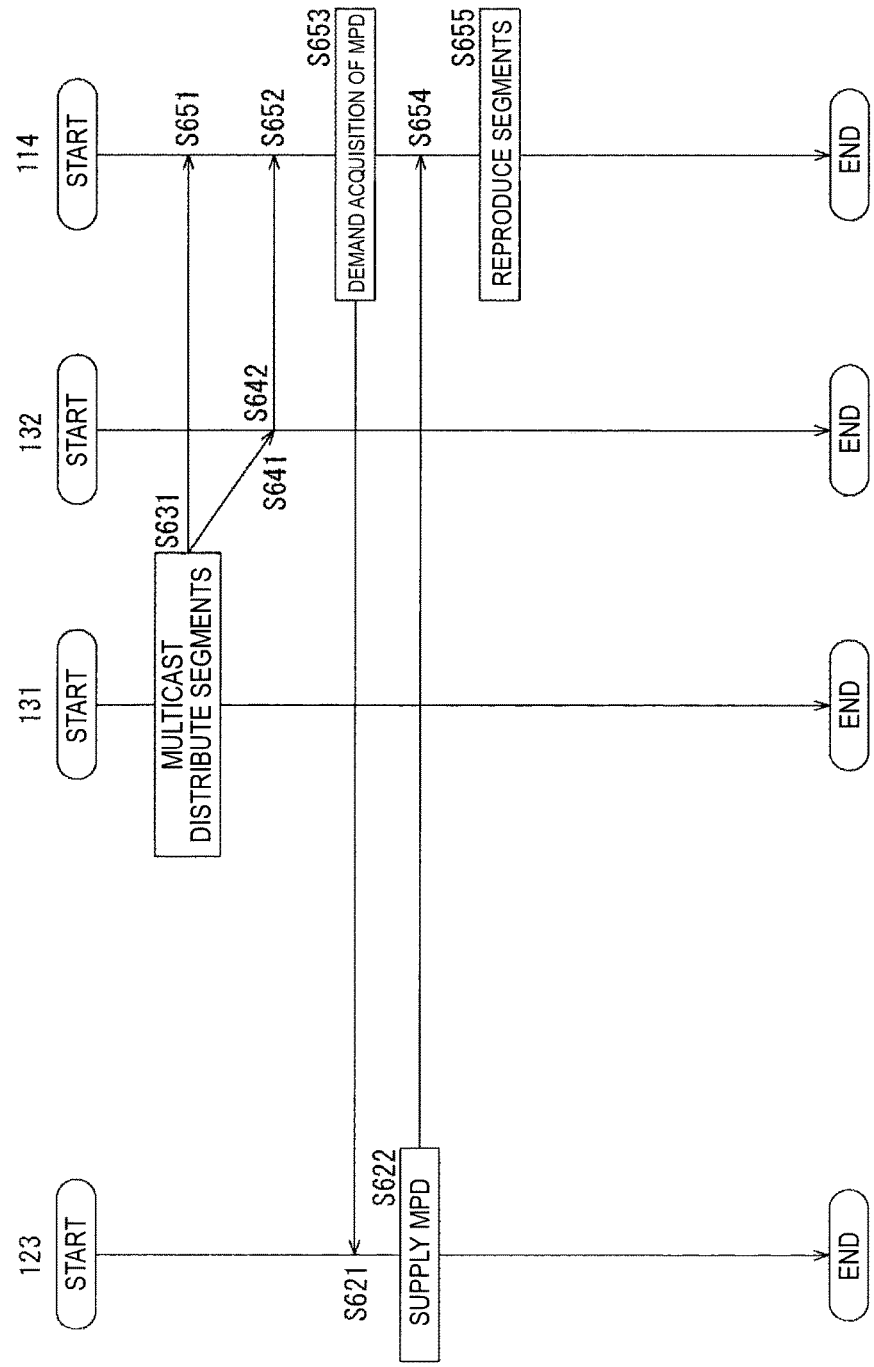
FIG. 40 is a flow chart which describes another example of the flow of a distribution process of an MPD and segments, in the case of multicast distribution or broadcast distribution.

Note that, the above described multicast of stream segments may be performed at the same time as the stream segments being generated. An example of the flow of processes in this case will be described by referring to the flow chart of FIG. 40.

Figure 39:
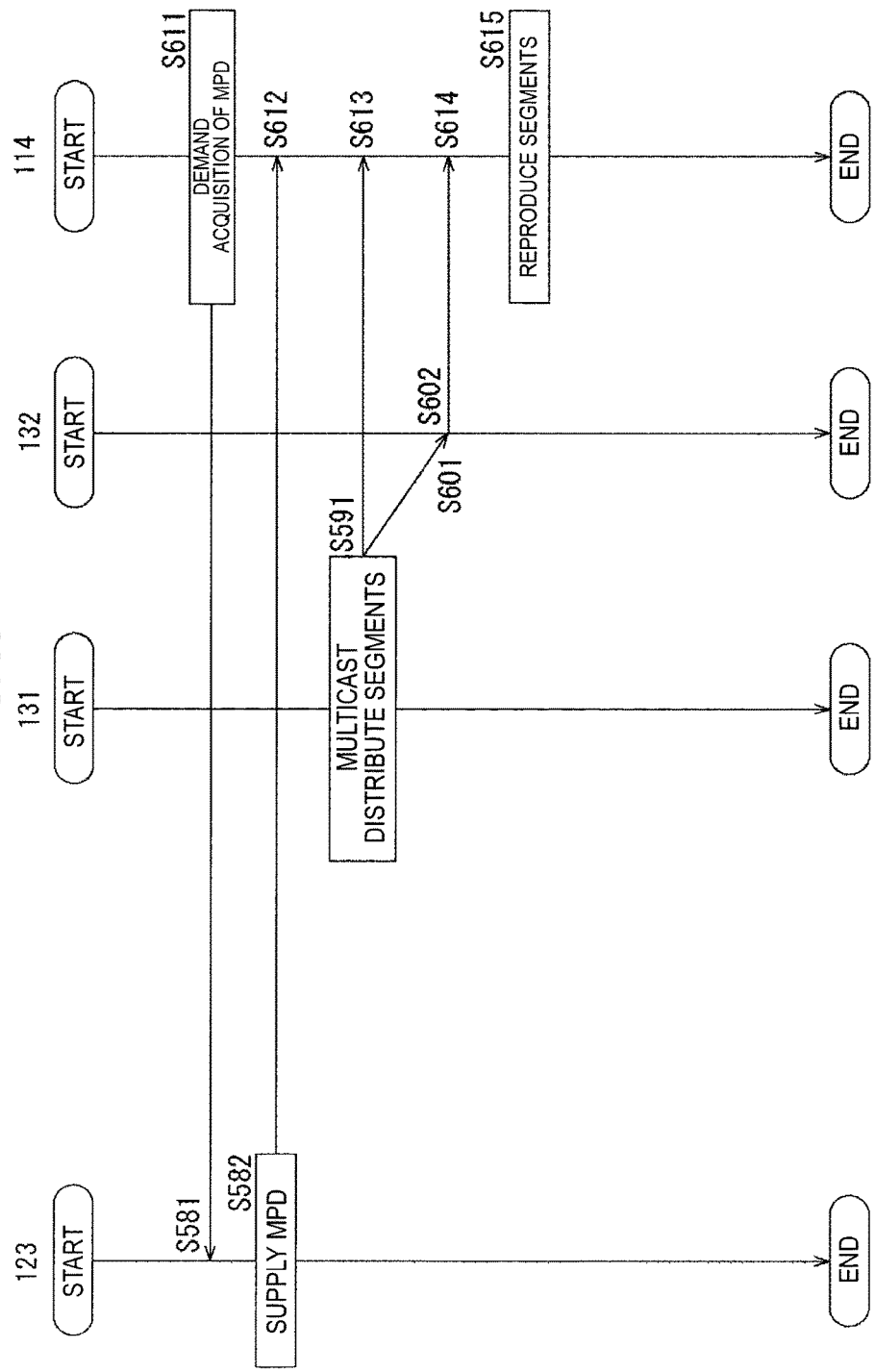
FIG. 39 is a flow chart which describes an example of the flow of a distribution process of an MPD and segments, in the case of multicast distribution or broadcast distribution.

In this case, the same processes are performed with only the process order being different to FIG. 39.

That is, the FLUTE server 131 performs the process of step S631 the same as the process of step S591, the broadcast distribution (MBMS) server 132 performs each of the processes of step S641 and step S642 the same as each of the processes of step S601 and step S602, and the DASH client 114 performs the process of step S651 the same as step S613, or performs the process of step S652 the same as step S614.

Also, the DASH client 114 performs each of the processes of step S653 and step S654 the same as step S611 and step S612, and the DASH-MPD server 123 performs each of the processes of step S621 and step S622 the same as each of the processes of step S581 and step S582.

Also, the DASH client 114 performs the process of step S655 the same as the process of step S615.

Distribution of a content can be performed by such a procedure.

Note that, MPD distribution can also be performed by broadcast (multicast) distribution by FLUTE. An example of the flow of processes in this case will be described by referring to the flow chart of FIG. 41.

In this case, the DASH-MPD server 123 supplies an MPD to the FLUTE server 131 (step S661).

When this MPD is acquired (step S671), the FLUTE server 131 multicast distributes this MPD (step S672). Note that, in the case of broadcast distributing the MPD, this process becomes a broadcast distribution request to the broadcast distribution (MBMS) server 132. In this case, the broadcast distribution (MBMS) server 132 acquires this request (segments) (step S681), and performs broadcast distribution (step S682).

In the case of multicast distribution, the DASH client 114 acquires an MPD supplied from the FLUTE server 131 (step S691), and in the case of broadcast distribution, acquires an MPD supplied from the broadcast distribution (MBMS) server 132 (step S692).

Distribution of segments is performed the same as the case of FIG. 39.

That is, the FLUTE server 131 performs the process of step S673 the same as the process of step S591, the broadcast distribution (MBMS) server 132 performs each of the processes of step S683 and step S684 the same as each of the processes of step S601 and step S602, and the DASH client 114 performs each of the processes of step S693 through to step S695 the same as each of the processes of step S613 through to step S615.

Distribution of an MPD can be performed by such a procedure.

Figure 41:
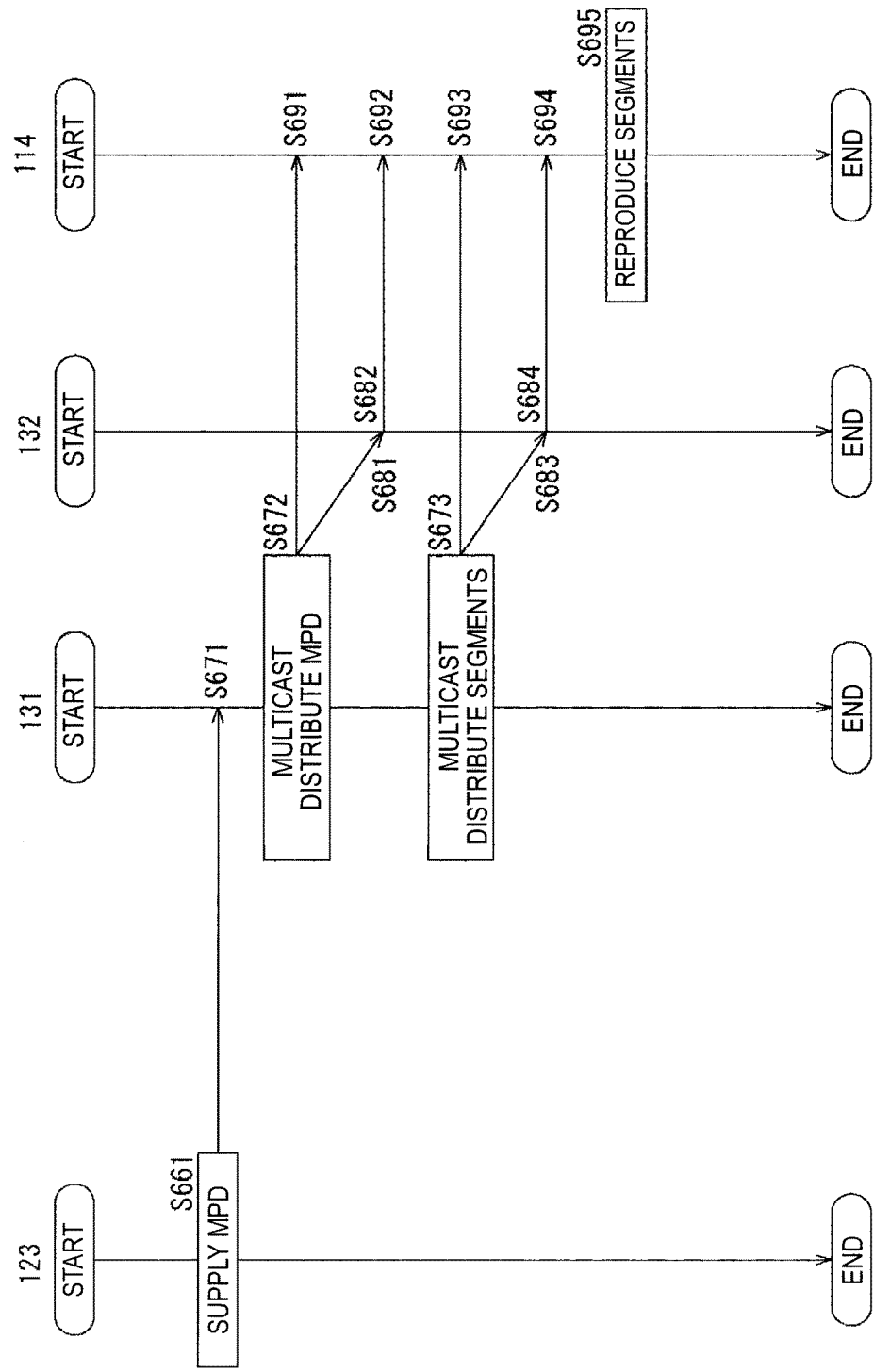
FIG. 41 is a flow chart which describes an example of the flow of a distribution process in the case where an MPD and segments are distributed by FLUTE.

The processes in the case of the flow chart of FIG. 41 can also be applied to the second embodiment. An example of the flow of the processes in this case will be described by referring to the flow chart of FIG. 42.

In this case, the DASH-MPD server 123, the FLUTE server 131 and the broadcast distribution (MBMS) server 132 execute each of the processes the same as the case of FIG. 41. That is, the DASH-MPD server 123 performs the process of step S701 the same as the process of step S661, the FLUTE server 131 performs each of the processes of step S711 through to step S713 the same as each of the processes of step S671 through to step S673, and the broadcast distribution (MBMS) server 132 performs each of the processes of step S721 through to step S724 the same as each of the processes of step S681 through to step S684.

Figure 42:
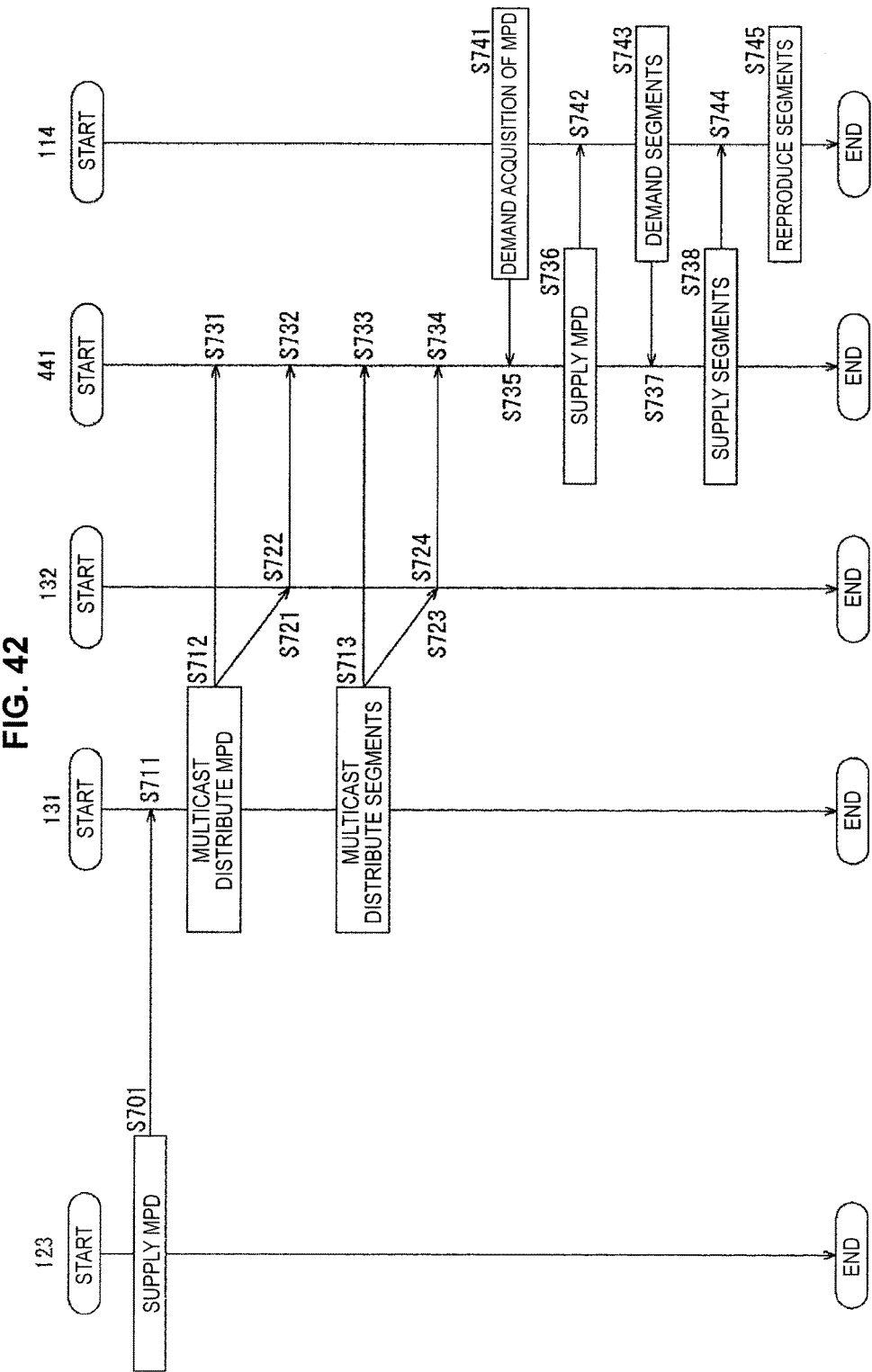
FIG. 42 is a flow chart which describes an example of the flow of a distribution process of an MPD and segments, in the case where performed via a proxy server.

However, in the case of FIG. 42, the distribution destination of an MPD and segments is the proxy server 441, and not the DASH client 114. In step S731 or step S732, the proxy server 441 acquires an MPD, and in step S733 or step S734, acquires segments.

The DASH client 114 acquires such an MPD and segments cached by the proxy server 441.

That is, the DASH client 114 demands the acquisition of an MPD to the proxy server 441 (step S741), and acquires an MPD supplied in accordance with this demand (step S742). When an MPD acquisition demand from the DASH client 114 is received (step S735), the proxy server 441 supplies the demanded MPD to the DASH client 114 which is a demand source (step S736).

Further, the DASH client 114 demands the acquisition of segments to the proxy server 441 (step S743), and acquires segments supplied in accordance with this demand (step S744). When a demand of segments from the DASH client 114 is received (step S737), the proxy server 441 supplies the demanded segments to the DASH client 114 which is a demand source (step S738).

The DASH client 114 which acquires the segments reproduces these segments (step S745).

As described above, an MPD and segments can be distributed via the proxy server 441.

Heretofore, while a case has been described which distributes a DASH stream, the present disclosure can be applied to an arbitrary content distribution technology other than DASH.

The series of processes described above can be executed by hardware but can also be executed by software. When the series of processes is executed by software, a program that constructs such software is installed into a computer, such as the one with the configuration shown in FIG. 18, for example. Here, the expression "computer" includes a computer in which dedicated hardware is incorporated and a general-purpose personal computer or the like that is capable of executing various functions when various programs are installed.

In the computer configured as shown in FIG. 18, the CPU 201 loads a program that is stored, for example, in the storage unit 213 onto the RAM 203 via the input/output interface 210 and the bus 204, and executes the program. Thus, the above-described series of processing is performed. The RAM 203 stores data in a suitable manner, which is necessary for the CPU 201 to execute various processing.

Programs to be executed by the computer (the CPU 201) are applied being recorded in the removable medium 221 which is a packaged medium or the like. Also, programs may be provided via a wired or wireless transmission medium, such as a local area network, the Internet or digital satellite broadcasting.

Then, by inserting the removable medium 221 into the drive 215, the program can be installed in the storage unit 213 via the input/output interface 210. Further, the program can be received by the communication unit 214 via a wired or wireless transmission medium and installed in the storage unit 213. Moreover, the program can be installed in advance in the ROM 202 or the storage unit 213.

It should be noted that the program executed by a computer may be a program that is processed in time series according to the sequence described in this specification or a program that is processed in parallel or at necessary timing such as upon calling.

It should be also noted that, in this specification, the steps describing the program stored in the recording medium include not only a process performed in time series according to the sequence shown therein but also a process executed in parallel or individually, not necessarily performed in time series.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

Further, an element described as a single device (or processing unit) above may be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same.

The preferred embodiments of the present disclosure have been described above with reference to the accompanying drawings, whilst the technical scope of the present disclosure is not limited to the above examples, of course. A person skilled in the art may find various alterations and modifications within the scope of the appended claims, and it should be understood that they will naturally come under the technical scope of the present disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing apparatus including:

a determination unit which determines whether or not to use multicast distribution or broadcast distribution for a supply of a content; and an updating unit which, in the case where it is determined to use the multicast distribution or the broadcast distribution by the determination unit, updates control information related to unicast distribution of the content so as to use the multicast distribution or the broadcast distribution for a supply of the content.

(2)

The information processing apparatus according to any one of (1) and (3) to (17), wherein the determination unit evaluates a cost of the case where multicast distribution or broadcast distribution is to be used for a supply of the content, and determines whether or not to use multicast distribution or broadcast distribution for a supply of the content in accordance with this evaluation result.

(3)

The information processing apparatus according to any one of (1), (2), and (4) to (17), further including:

a reception unit which receives the control information, wherein the determination unit evaluates a cost of the case where multicast distribution or broadcast distribution is to be used for a supply of the content in accordance with the control information received by the reception unit, and determines whether or not to use multicast distribution or broadcast distribution for a supply of the content in accordance with this evaluation result, and wherein, in the case where it is determined to use the multicast distribution or the broadcast distribution by the determination unit, the updating unit updates the control information received by the reception unit so as to use the multicast distribution or the broadcast distribution for a supply of the content.

(4)

The information processing apparatus according to any one of (1) to (3) and (5) to (17), wherein the determination unit evaluates the cost in accordance with an amount of the control information received by the reception unit.

(5)

The information processing apparatus according to any one of (1) to (4) and (6) to (17), wherein the reception unit receives the control information supplied from a client connected to a prescribed network.

(6)

The information processing apparatus according to any one of (1) to (5) and (7) to (17), wherein the reception unit receives the control information, supplied from a proxy server of a server supplying the content, which has been collected from a client by the proxy server.

(7)

The information processing apparatus according to any one of (1) to (6) and (8) to (17), further including:

a confirmation unit which confirms a use condition of a resource of multicast distribution or broadcast distribution, wherein the determination unit evaluates the cost for the case where the usable resource confirmed by the confirmation unit is to be used.

(8)

The information processing apparatus according to any one of (1) to (7) and (9) to (17), further including:

a securing unit which, in the case where it is determined to use the multicast distribution or the broadcast distribution by the determination unit, secures a resource of multicast distribution or broadcast distribution for supplying the content, wherein the updating unit updates the control information so as to use the resource secured by the securing unit for a supply of the content.

(9)

The information processing apparatus according to any one of (1) to (8) and (10) to (17), wherein the content is a stream of a Dynamic Adaptive Streaming over HTTP (DASH) format, and wherein the control information is a Media Presentation Description (MPD).

(10)

The information processing apparatus according to any one of (1) to (9) and (11) to (17), wherein the updating unit stores an identifier which identifies multicast distribution or broadcast distribution to be used for a supply of the content in a DeliverySystemIdentifier of a Service Location file designated by a serviceLocationAttribute URL attribute arranged in a BaseURL of the MPD.

(11)

The information processing apparatus according to any one of (1) to (10) and (12) to (17), wherein the updating unit stores a parameter for acquiring stream data in a system corresponding to an identifier stored in the DeliverySystemIdentifier in a DeliverySystemDescriptor of a Service Location file designated by a serviceLocationAttribute URL attribute arranged in a BaseURL of the MPD.

(12)

The information processing apparatus according to any one of (1) to (11) and (13) to (17), further including:

a unicast distribution unit which unicast distributes a stream for a unicast of the content.

(13)

The information processing apparatus according to any one of (1) to (12) and (14) to (17), further including:

a conversion unit which converts the stream for a unicast of the content into a stream for multicast distribution or broadcast distribution; and a BC/MC distribution unit which multicast distributes or broadcast distributes the stream generated by the conversion unit.

(14)

The information processing apparatus according to any one of (1) to (13) and (15) to (17), wherein the stream for a unicast is a stream of a Dynamic Adaptive Streaming over HTTP (DASH) format, and wherein the stream for multicast distribution or broadcast distribution generated by the conversion unit is a file of a File Delivery over Unidirectional Transport (FLUTE) protocol.

(15)

The information processing apparatus according to any one of (1) to (14), (16), and (17), wherein the conversion unit introduces a range attribute as an attribute of a File element in a File Delivery Table (FDT)-Instance of the file of a FLUTE protocol.

(16)

The information processing apparatus according to any one of (1) to (15) and (17), further including:

a supply unit which supplies the control information updated by the updating unit.

(17)

The information processing apparatus according to any one of (1) to (16), further including:

a supply control unit which acquires the content instead of a client, and supplies the acquired content to the client by unicast distribution, or supplies the acquired content to the client by using a resource of multicast distribution or broadcast distribution, in accordance with the control information supplied by the supply unit.

(18)

An information processing method including:

determining whether or not to use multicast distribution or broadcast distribution for a supply of a content; and updating, in the case where it is determined to use the multicast distribution or the broadcast distribution, control information related to unicast distribution of the content so as to use the multicast distribution or the broadcast distribution for a supply of the content.

(19)

A program for causing a computer to function as:

a determination unit which determines whether or not to use multicast distribution or broadcast distribution for a supply of a content; and an updating unit, in the case where it is determined to use the multicast distribution or the broadcast distribution by the determination unit, which updates control information related to unicast distribution of the content so as to use the multicast distribution or the broadcast distribution for a supply of the content.

(20)

A content supply system which supplies a content from a server to a client, including:

determining whether or not to use multicast distribution or broadcast distribution for a supply of the content in accordance with an acquisition demand amount of the content from the client; and updating, in the case where it is determined to use the multicast distribution or the broadcast distribution, control information related to unicast distribution of the content so as to use the multicast distribution or the broadcast distribution for a supply of the content from the server to the client.

REFERENCE SIGNS LIST

100 content distribution system
111 content provision system
112 distribution control system
113 network
114 DASH client
121 content management server
122 DASH segment streamer
123 DASH-MPD server
124 BC/MC service provider
131 FLUTE server
132 broadcast distribution server
141 MPD configurator
142 BC/MC resource manager
143 DASH client proxy
361 MPD acquisition unit
362 resource information demand unit
363 resource information acquisition unit
364 cost evaluation unit
365 resource securing demand unit
366 resource securing result notification acquisition unit
367 MPD updating unit
368 MPD supply unit
371 resource information demand acquisition unit
372 resource information generation unit
373 resource information supply unit
374 resource securing demand acquisition unit
375 resource securing unit
376 resource securing result notification unit
381 MPD acquisition unit
382 MPD supply unit
383 segment demand unit
384 segment acquisition unit
385 FLUTE distribution request unit
400 content distribution system
441 proxy server

The invention claimed is:

1. An information processing apparatus, comprising:
 reception circuitry configured to receive control information related to unicast distribution of a content, the control information including a Media Presentation Description (MPD); and
 processing circuitry configured to
  evaluate a cost when multicast distribution or broadcast distribution is to be used for a supply of the content in accordance with the control information received by the reception circuitry;
  determine whether or not to use the multicast distribution or the broadcast distribution for the supply of the content in accordance with the evaluation result;
  update, when the multicast distribution or the broadcast distribution is determined to be used for the supply of the content, the control information received by the reception circuitry so as to use the multicast distribution or the broadcast distribution for the supply of the content; and
  store an identifier which identifies the multicast distribution or the broadcast distribution to be used for the supply of the content according to a service location attribute in a Base URL of the MPD.

2. The information processing apparatus according to claim 1, wherein the processing circuitry is configured to evaluate the cost in accordance with an amount of the control information received by the reception circuitry.

3. The information processing apparatus according to claim 1, wherein the reception circuitry is configured to receive the control information supplied from a client connected to a network.

4. The information processing apparatus according to claim 1, wherein the reception circuitry is configured to receive the control information, supplied from a proxy server of a server supplying the content, which has been collected from a client by the proxy server.

5. The information processing apparatus according to claim 1, wherein the processing circuitry is configured to
 confirm a usable condition of a resource of the multicast distribution or the broadcast distribution, and
 evaluate the cost when the confirmed usable resource is to be used.

6. The information processing apparatus according to claim 1, wherein the processing circuitry is configured to
 secure, when the multicast distribution or the broadcast distribution is determined to be used, a resource of the multicast distribution or the broadcast distribution for supplying the content, and
 update the control information so as to use the secured resource for the supply of the content.

7. The information processing apparatus according to claim 1,
 wherein the content is a stream of a Dynamic Adaptive Streaming over HTTP (DASH) format.

8. The information processing apparatus according to claim 1, wherein
 the service location attribute is a serviceLocationAttribute URL attribute, and
 the processing circuitry is configured to store the identifier which identifies the multicast distribution or the broadcast distribution to be used for the supply of the content in a DeliverySystemIdentifier of a Service Location file designated by the serviceLocationAttribute URL attribute arranged in the Base URL of the MPD.

9. The information processing apparatus according to claim 8, wherein the processing circuitry is configured to store a parameter for acquiring stream data in a system corresponding to an identifier stored in the DeliverySystemIdentifier in a DeliverySystemDescriptor of the Service Location file designated by the serviceLocationAttribute URL attribute arranged in the Base URL of the MPD.

10. The information processing apparatus according to claim 1, wherein the processing circuitry is configured to unicast distribute a stream for a unicast of the content.

11. The information processing apparatus according to claim 10, wherein the processing circuitry is configured to
convert the stream for the unicast of the content into a stream for the multicast distribution or the broadcast distribution; and
multicast distribute or broadcast distribute the converted stream.

12. The information processing apparatus according to claim 11,
wherein the stream for the unicast is a stream of a Dynamic Adaptive Streaming over HTTP (DASH) format, and
wherein the converted stream for the multicast distribution or the broadcast distribution is a file of a File Delivery over Unidirectional Transport (FLUTE) protocol.

13. The information processing apparatus according to claim 12, wherein the processing circuitry is configured to introduce a range attribute as an attribute of a File element in a File Delivery Table (FDT)-Instance of the file of the FLUTE protocol.

14. The information processing apparatus according to claim 1, wherein the processing circuitry is configured to supply the updated control information.

15. The information processing apparatus according to claim 14, wherein the processing circuitry is configured to
acquire the content instead of a client, and
supply the acquired content to the client by the unicast distribution, or supply the acquired content to the client by using a resource of the multicast distribution or the broadcast distribution, in accordance with the supplied control information.

16. An information processing method comprising:
receiving, by reception circuitry, control information related to unicast distribution of a content, the control information including a Media Presentation Description (MPD);
evaluating, by processing circuitry, a cost when multicast distribution or broadcast distribution is to be used for a supply of the content in accordance with the received control information;
determining whether or not to use the multicast distribution or the broadcast distribution for the supply of the content in accordance with the evaluation result;
updating, when the multicast distribution or the broadcast distribution is determined to be used, the received control information so as to use the multicast distribution or the broadcast distribution for the supply of the content, and
storing an identifier which identifies the multicast distribution or the broadcast distribution to be used for the supply of the content according to a service location attribute in a Base URL of the MPD.

17. A non-transitory computer readable medium including a computer executable program which when executed by a computer causes the computer to perform an information processing method, the information processing method comprising:
receiving control information related to unicast distribution of a content, the control information including a Media Presentation Description (MPD);
evaluating a cost when multicast distribution or broadcast distribution is to be used for a supply of the content in accordance with the received control information;
determine whether or not to use the multicast distribution or the broadcast distribution for the supply of the content in accordance with the evaluation result;
updating, when the multicast distribution or the broadcast distribution is determined to be used, the received control information so as to use the multicast distribution or the broadcast distribution for the supply of the content, and
storing an identifier which identifies the multicast distribution or the broadcast distribution to be used for the supply of the content according to a service location attribute in a Base URL of the MPD.

18. A client apparatus comprising:
processing circuitry configured to
receive a content via a multicast distribution or a broadcast distribution, wherein
when the multicast distribution or the broadcast distribution has been determined to be used for supply of the content according to a Media Presentation Description (MPD), a used multicast distribution or the broadcast distribution is identified according to a service location attribute in a Base URL of the MPD.

19. The client apparatus according to claim 18, wherein the content is a stream of a Dynamic Adaptive Streaming over HTTP (DASH) format.

20. The client apparatus according to claim 18, wherein the service location attribute is a URL attribute associated with a service location.

21. The client apparatus according to claim 18, wherein the content includes a multicast or broadcast stream, which includes a file of a File Delivery over Unidirectional Transport (FLUTE) protocol.

22. The client apparatus according to claim 18, wherein the processing circuitry is configured to
receive updated control information.

23. The information processing apparatus according to claim 22, wherein the processing circuitry is configured to
receive a content by a unicast distribution or a multicast distribution or a broadcast distribution, in accordance with the updated control information.

24. A client processing method comprising:
receiving, by processing circuitry, a content via a multicast distribution or a broadcast distribution, wherein
when the multicast distribution or the broadcast distribution has been determined to be used for supply of the content according to a Media Presentation Description (MPD), a used multicast distribution or the broadcast distribution is identified according to a service location attribute in a Base URL of the MPD.

* * * * *